Figure 19:
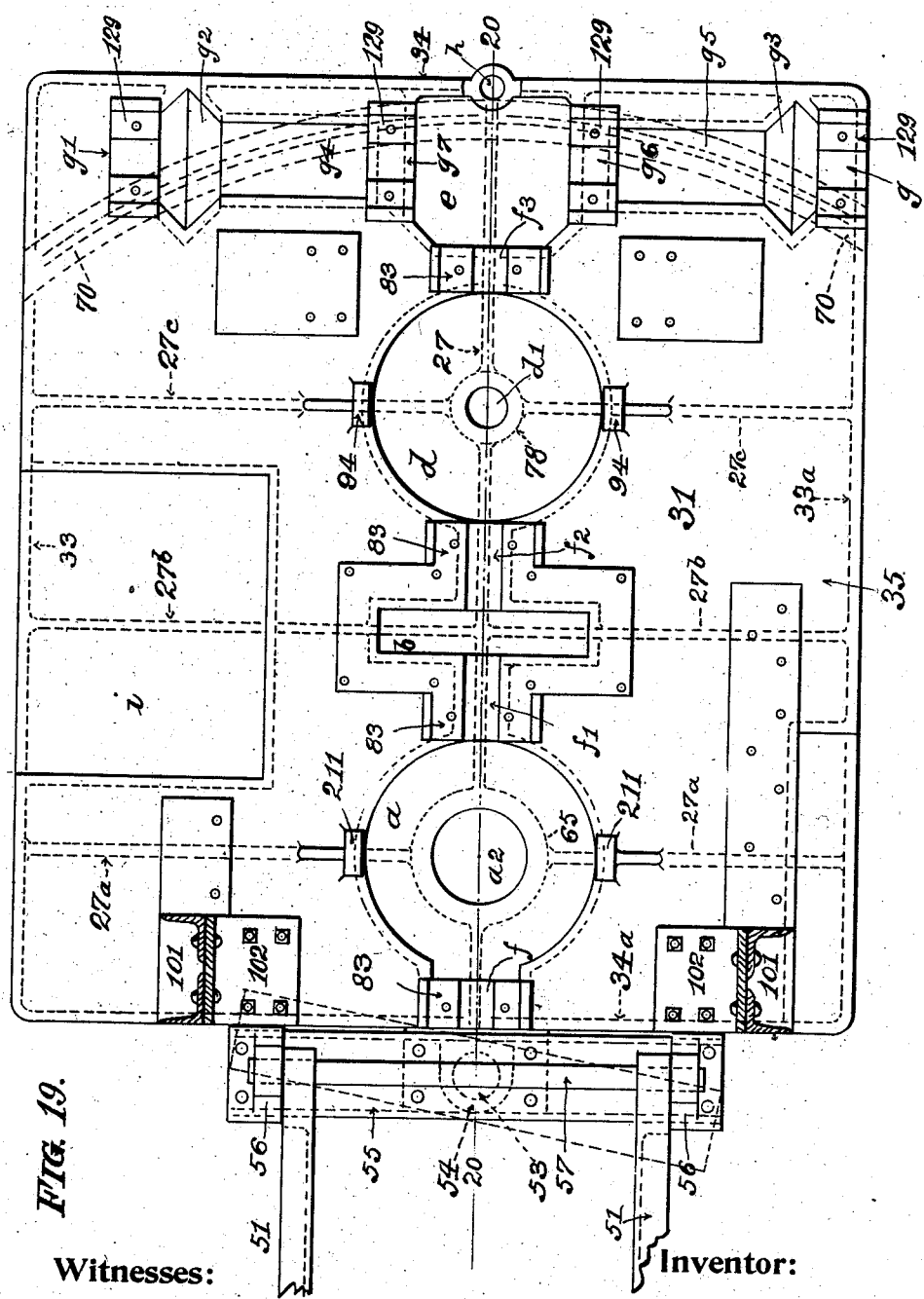

G. W. JACKSON.
MACHINE FOR HANDLING LOOSE MATERIALS.
APPLICATION FILED JUNE 1, 1909.
1,021,463.
Patented Mar. 26, 1912.
11 SHEETS—SHEET 1.
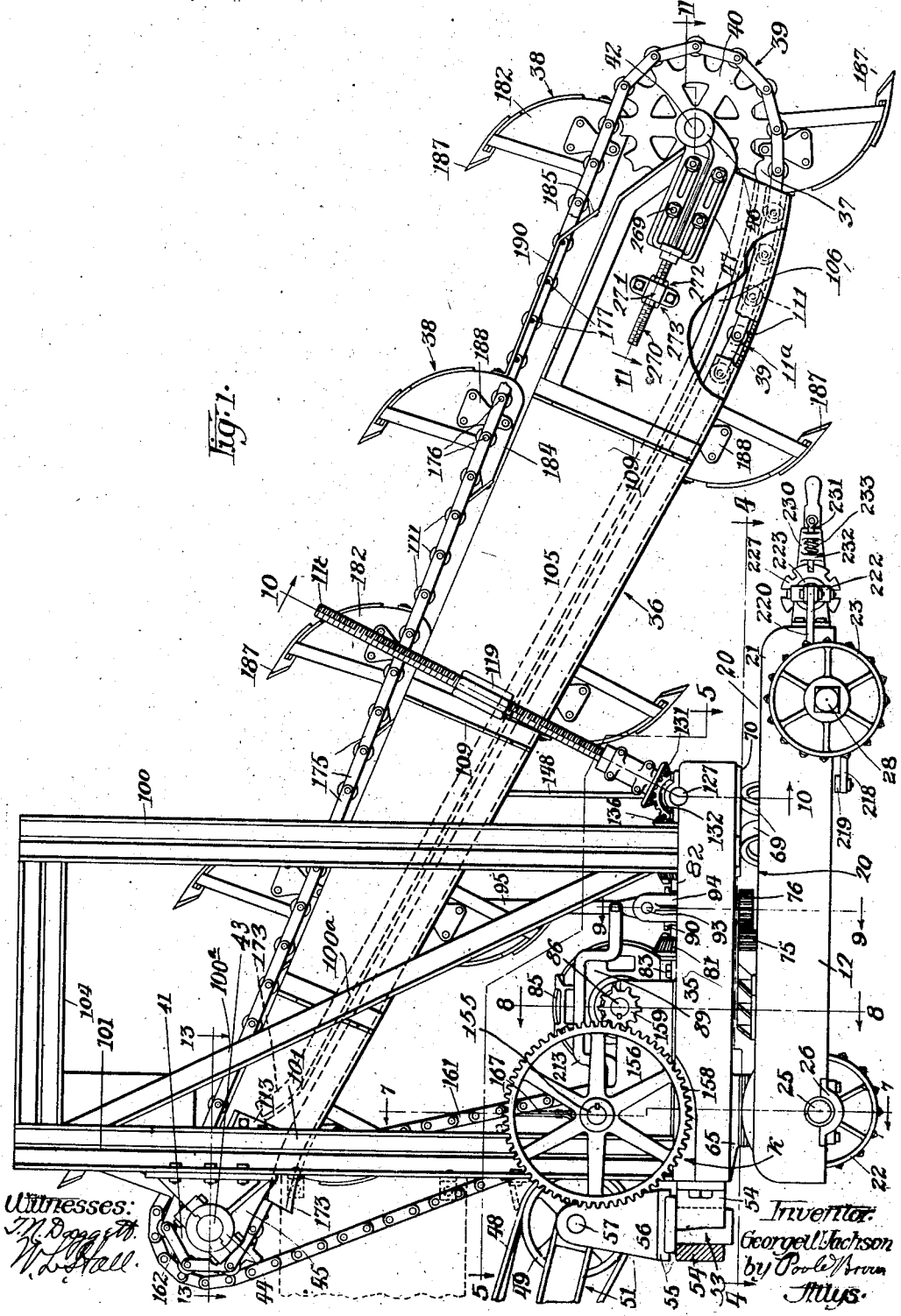

G. W. JACKSON.
MACHINE FOR HANDLING LOOSE MATERIALS.
APPLICATION FILED JUNE 1, 1909.
1,021,463.
Patented Mar. 26, 1912.
11 SHEETS—SHEET 2.
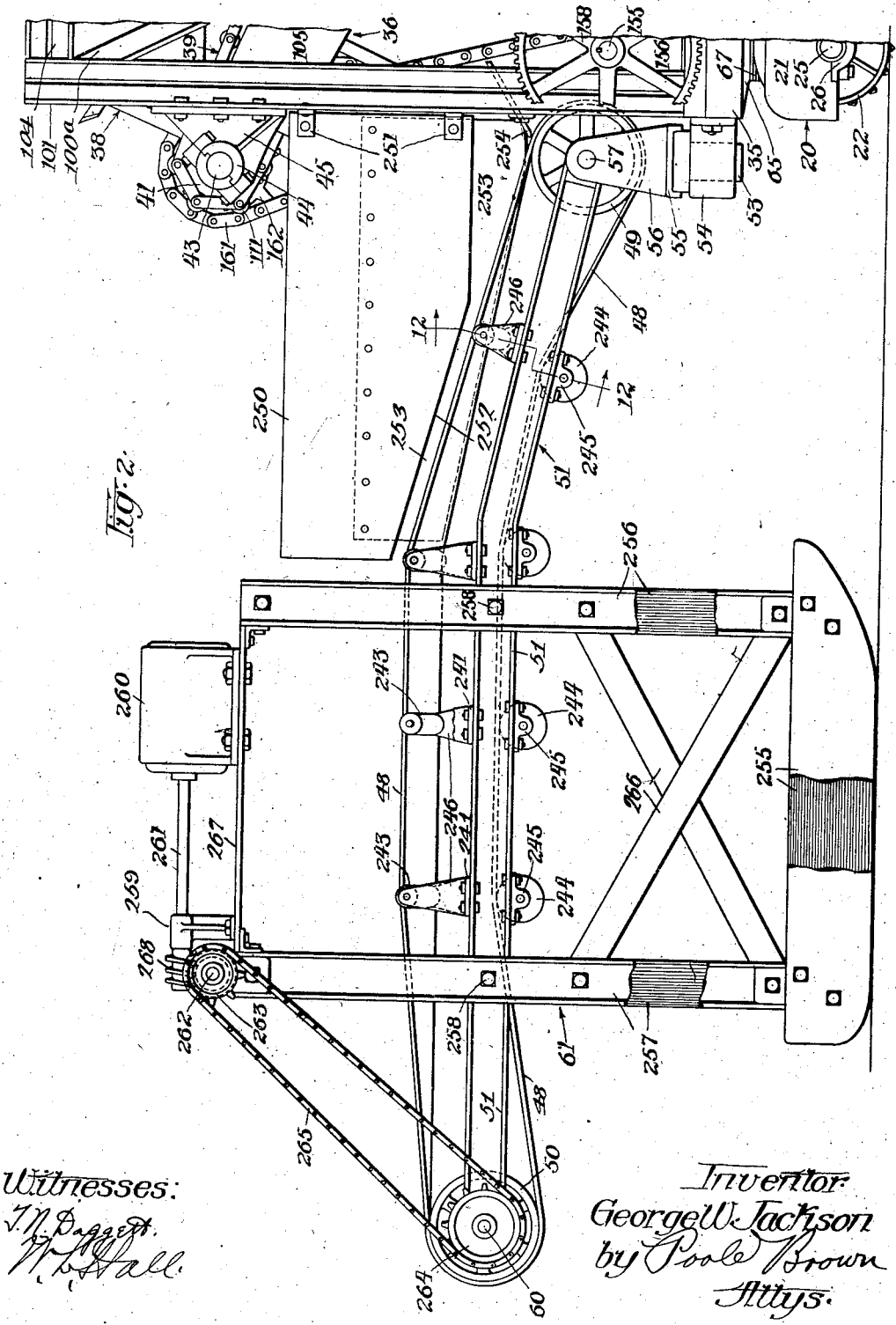

G. W. JACKSON.
MACHINE FOR HANDLING LOOSE MATERIALS.
APPLICATION FILED JUNE 1, 1909.
1,021,463.
Patented Mar. 26, 1912.
11 SHEETS—SHEET 3.
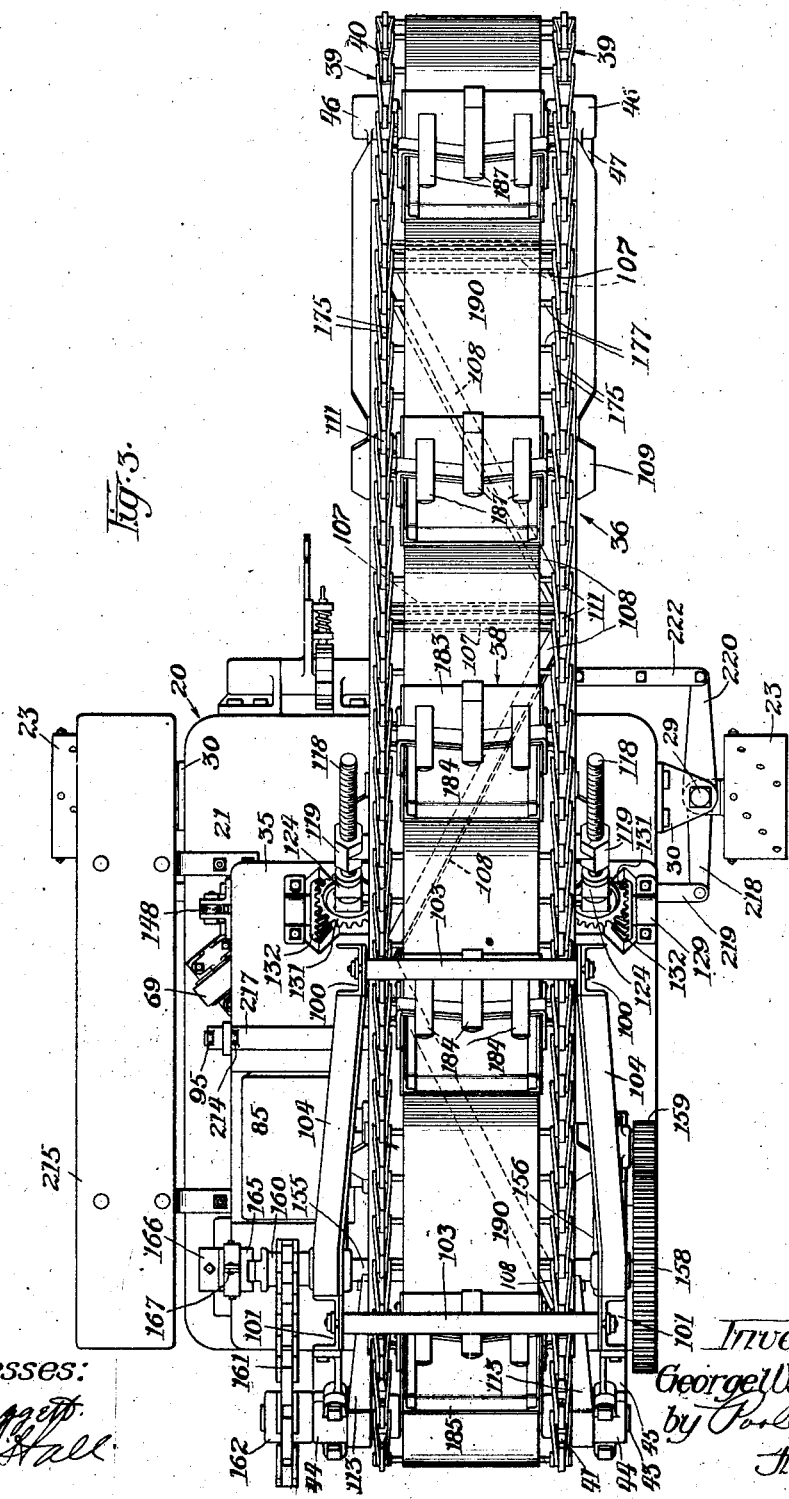

G. W. JACKSON.
MACHINE FOR HANDLING LOOSE MATERIALS.
APPLICATION FILED JUNE 1, 1909.
1,021,463.
Patented Mar. 26, 1912.
11 SHEETS—SHEET 4.
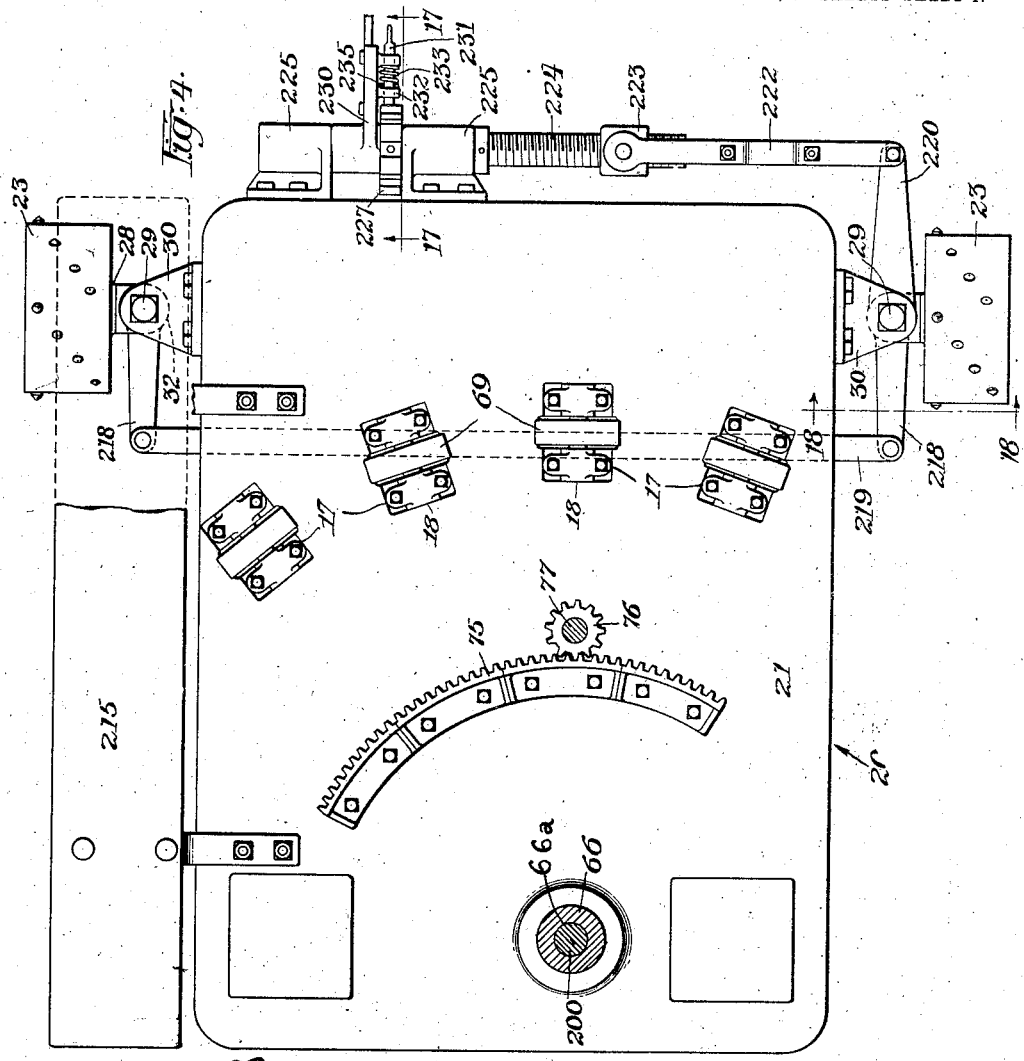
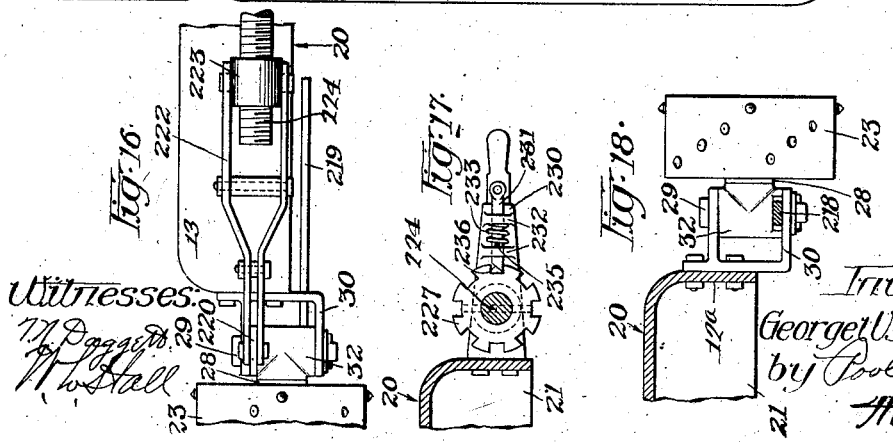

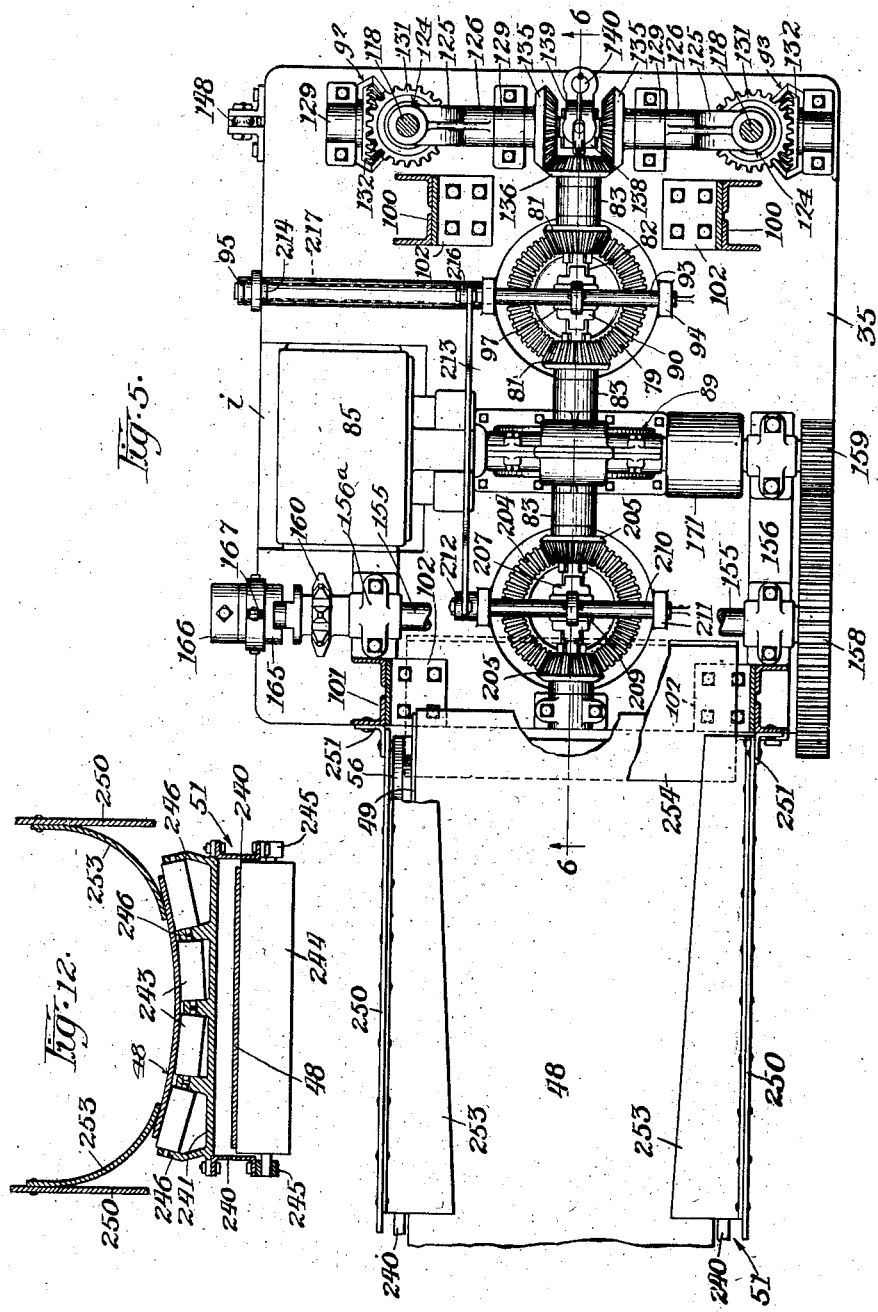

G. W. JACKSON.
MACHINE FOR HANDLING LOOSE MATERIALS.
APPLICATION FILED JUNE 1, 1909.
1,021,463.
Patented Mar. 26, 1912.
11 SHEETS—SHEET 6.
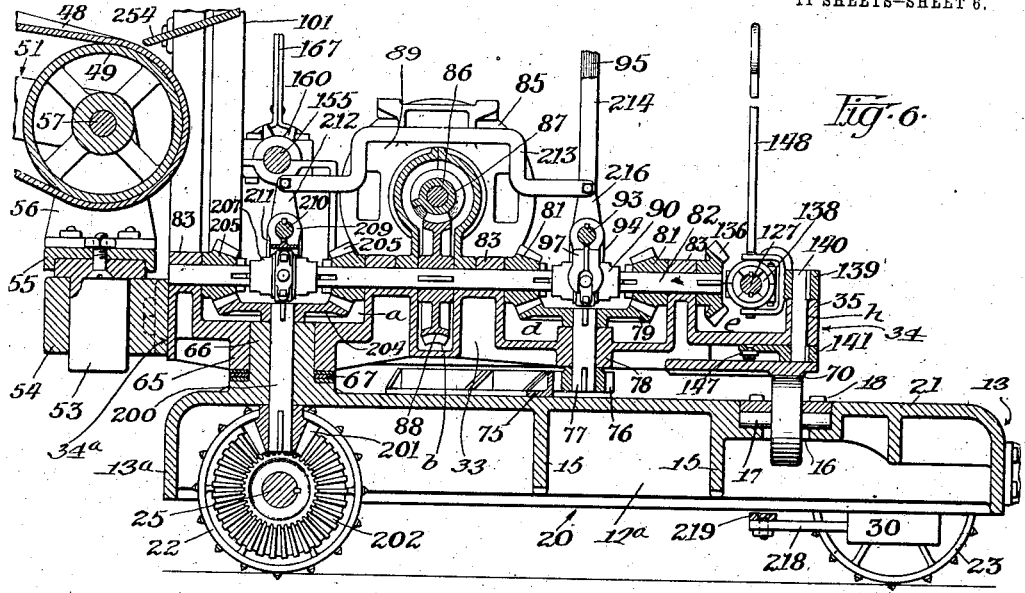
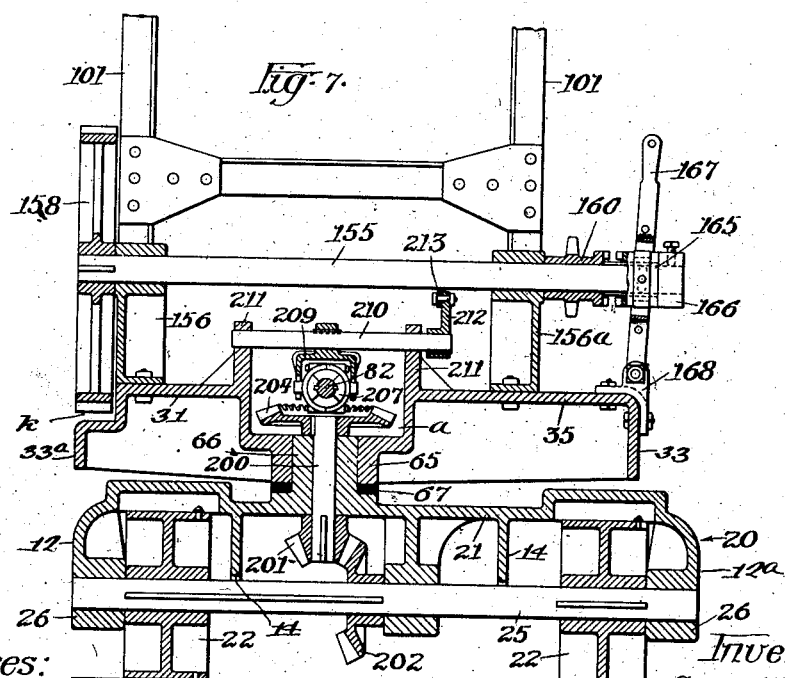
Witnesses:
Inventor:
George W. Jackson
by Poole Brown
Attys.

G. W. JACKSON.
MACHINE FOR HANDLING LOOSE MATERIALS.
APPLICATION FILED JUNE 1, 1909.
1,021,463.
Patented Mar. 26, 1912.
11 SHEETS—SHEET 7.
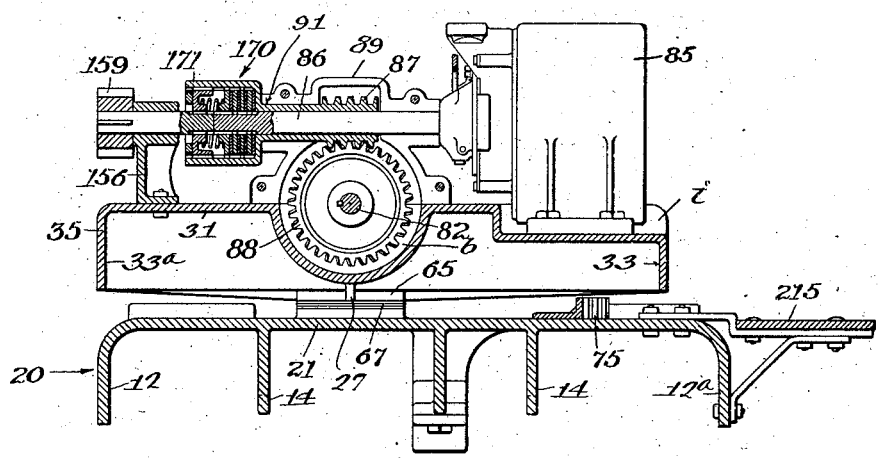
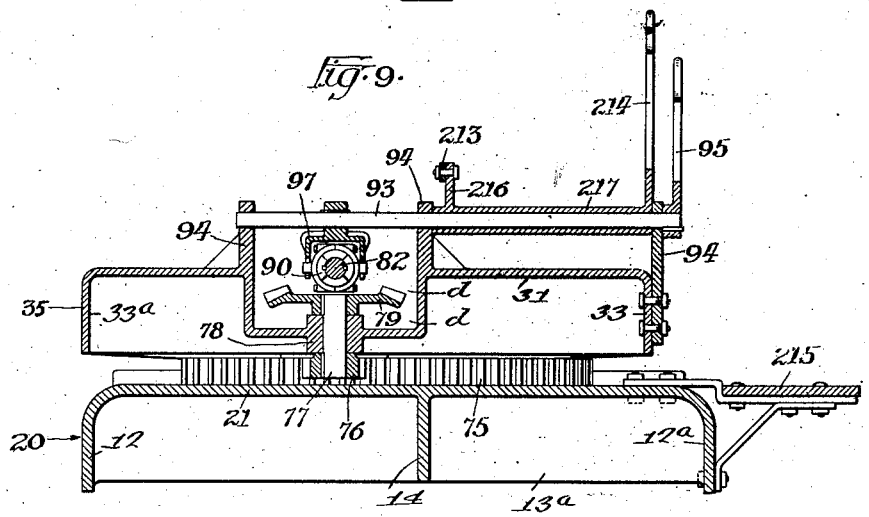

G. W. JACKSON.
MACHINE FOR HANDLING LOOSE MATERIALS.
APPLICATION FILED JUNE 1, 1909.
1,021,463.
Patented Mar. 26, 1912.
11 SHEETS—SHEET 8.
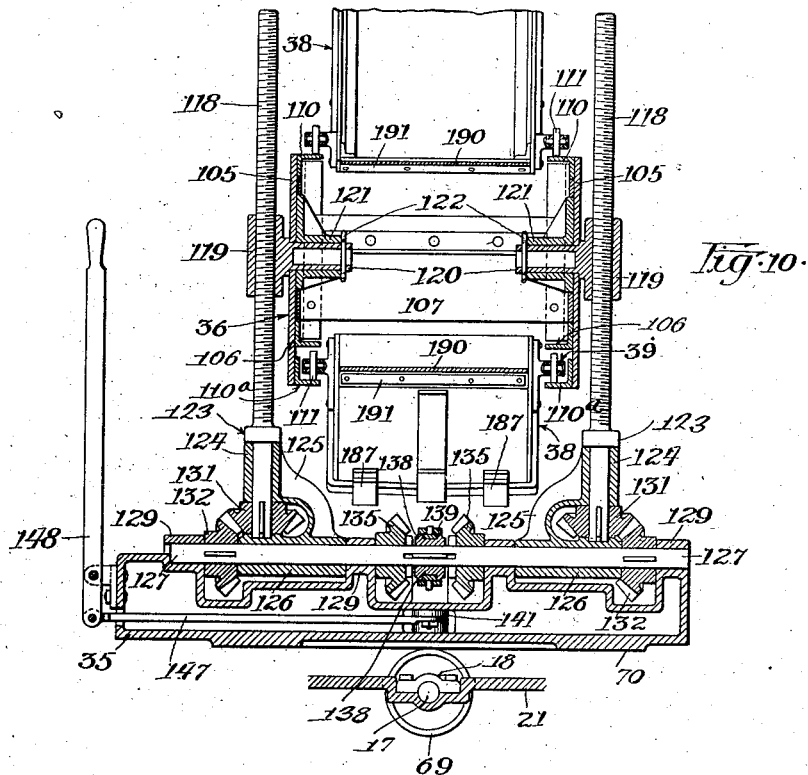
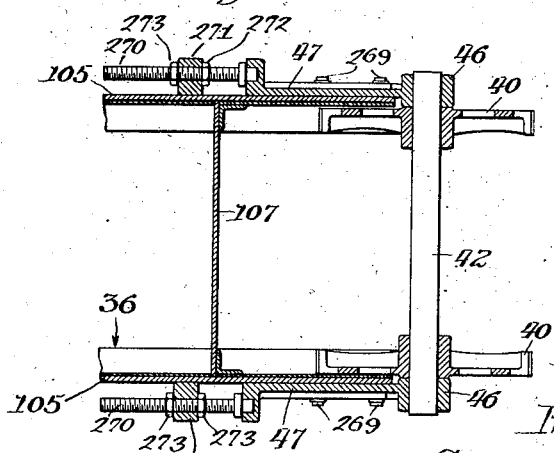
Witnesses:
Inventor:
George W. Jackson.
by Poole & Brown
Attys.

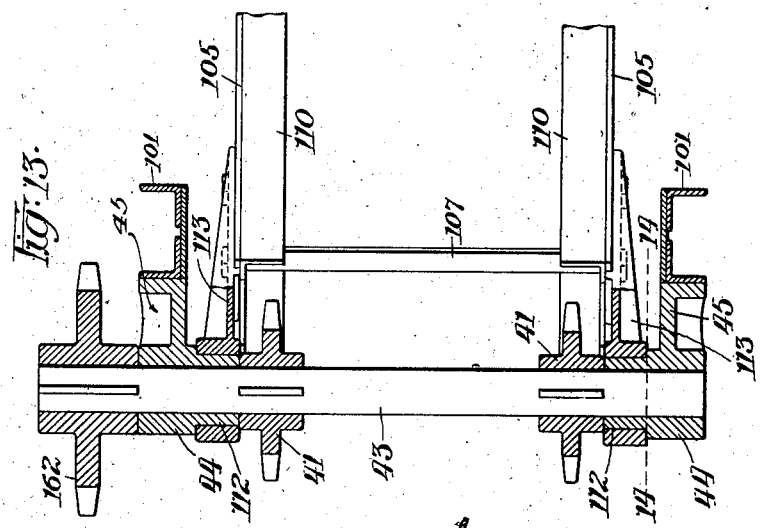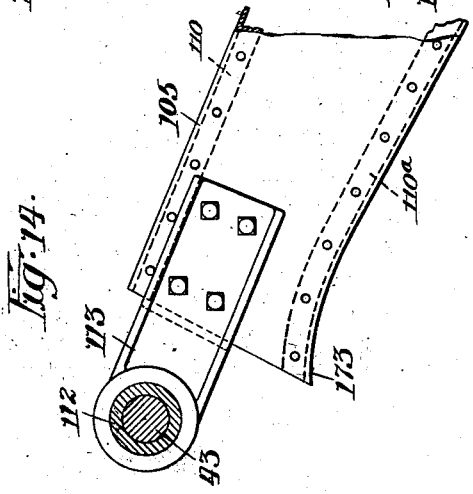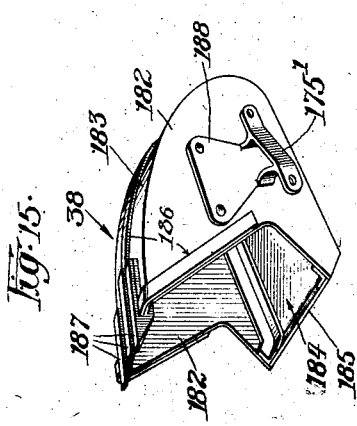

G. W. JACKSON.
MACHINE FOR HANDLING LOOSE MATERIALS.
APPLICATION FILED JUNE 1, 1909.

1,021,463.

Patented Mar. 26, 1912.
11 SHEETS—SHEET 10.

Witnesses:
E. B. Knudsen
A. D. Peterson

Inventor:
GEORGE W. JACKSON,
By Michael J. Stark & Sons,
Attorneys

G. W. JACKSON.
MACHINE FOR HANDLING LOOSE MATERIALS.
APPLICATION FILED JUNE 1, 1909.
1,021,463.
Patented Mar. 26, 1912.
11 SHEETS—SHEET 11.
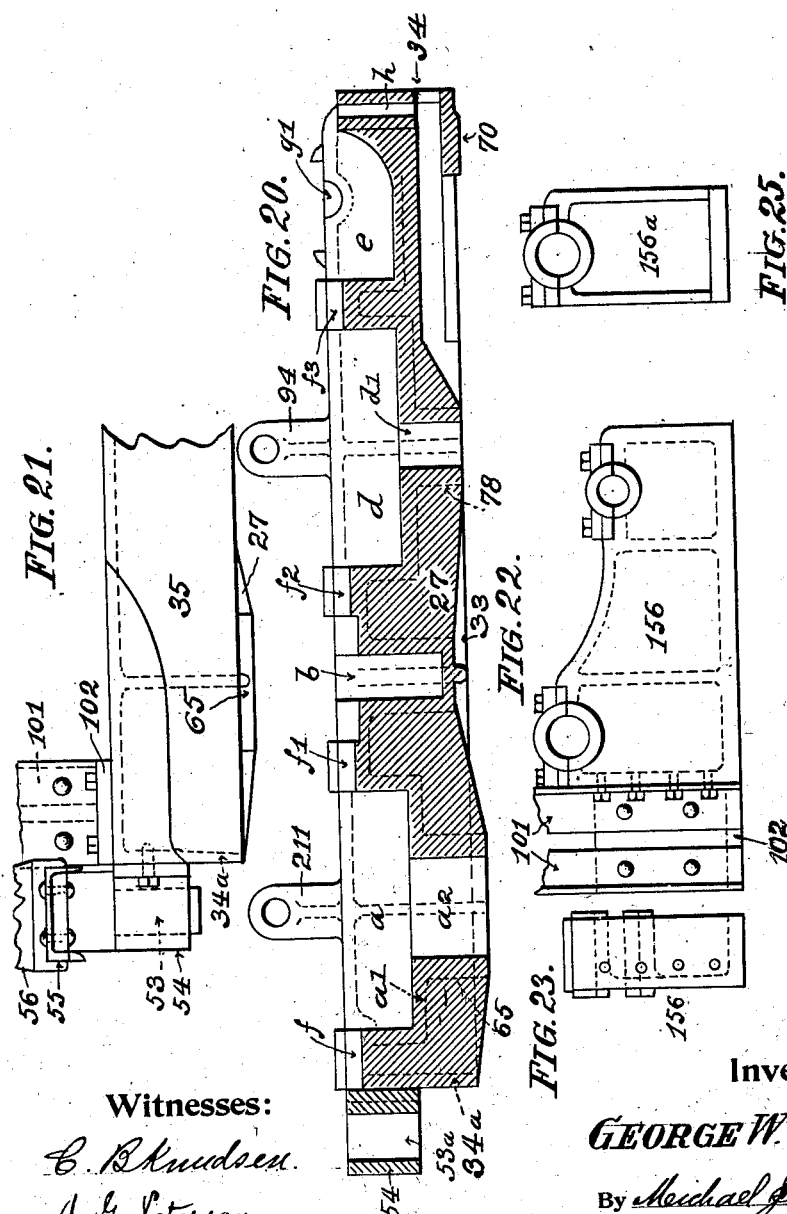
Witnesses:
C. B. Knudsen.
A. G. Peterson.
Inventor:
GEORGE W. JACKSON,
By Michael J. Stark & Sons,
Attorneys

UNITED STATES PATENT OFFICE.

GEORGE W. JACKSON, OF CHICAGO, ILLINOIS, ASSIGNOR, BY MESNE ASSIGNMENTS, TO GEORGE W. JACKSON MANUFACTURING COMPANY, OF CHICAGO, ILLINOIS, A CORPORATION OF ILLINOIS.

MACHINE FOR HANDLING LOOSE MATERIALS.

1,021,463. Specification of Letters Patent. Patented Mar. 26, 1912.

Application filed June 1, 1909. Serial No. 499,527.

*To all whom it may concern:*

Be it known that I, GEORGE W. JACKSON, a citizen of the United States, and a resident of Chicago, in the county of Cook and State of Illinois, have invented certain new and useful Improvements in Machines for Handling Loose Materials; and I do hereby declare that the following is a full, clear, and exact description thereof, reference being had to the accompanying drawings, and to the characters of reference marked thereon, which form a part of this specification.

This invention relates to improvements in machines for picking up and conveying to a desired place loose material, such as broken stones, coal, ore, and the like.

The invention refers to a machine which is specially applicable for use in excavating and mining work for picking up the broken and loose matter from a tunnel or mine-floor after it has been broken up by the blast, and conveying such material back to, and loading the same upon cars placed in the rear of the machine, by which it is removed from the tunnel, mine, trench and other excavations.

This invention consists, essentially, in the novel and peculiar combination of parts and details of construction as hereinafter first fully set forth and described and then pointed out in the claims.

In the drawings, Figure 1 is a side elevation of the front-part or picking-up and elevating mechanism of a machine embodying my invention. Fig. 2 is a side elevation of the rear part or take-off mechanism of the machine. Fig. 3 is a plan of that portion of the machine shown in Fig. 1. Fig. 4 is a plan of the truck on line 4—4, of Fig. 1. Fig. 5 is a horizontal section on the indirect line 5—5, of Fig. 1. Fig. 6 is a vertical section on line 6—6 of Fig. 5. Fig. 7 is a vertical section on line 7—7 of Fig. 1. Fig. 8 is a detail vertical section on line 8—8 of Fig. 1. Fig. 9 is a detail sectional view on line 9—9 of Fig. 1. Fig. 10 is a detail vertical section on line 10—10, of Fig. 1. Fig. 11 is a detail section on line 11—11 of Fig. 1, of the forward end of the boom, and illustrating the means for separately tensioning the two link-chains of the elevator, and picking-up mechanism. Fig. 12 is a detail vertical section on line 12—12, of Fig. 2, of the rear conveyer-belt and the guide-members for the same. Fig. 13 is a detail section on line 13—13 of Fig. 1, of the rear end of the boom and portion of the vertical supports at the rear end of the turntable, and the mechanism for operating the rear conveyer. Fig. 14 is a detail sectional view of the rear-end of the boom, on line 14—14 of Fig. 13, with parts omitted. Fig. 15 is a perspective view of one of the pick-up and elevator buckets. Fig. 16 is a fragmentary front elevation of part of the steering device of the truck. Fig. 17 is a fragmentary vertical section on line 17—17, of Fig. 4. Fig. 18 is a fragmentary vertical section on line 18—18 of Fig. 4. Fig. 19 is a plan of the turn-table, and a fragment of the rear conveying mechanism, all the parts of the operating mechanism on the turn-table being removed. Fig. 20 is a longitudinal sectional view of the same on line 20—20, of Fig. 19. Fig. 21 is a side view of the rear end of said turn-table and illustrating especially the pivotal connection between the forward, and the rear, part of the machine. Fig. 22 is a side elevation of the standard carrying the motor shaft and the shaft connected thereto which operates the elevator-mechanism on the boom. Fig. 23 is an end view of the same, and Fig. 24, a plan thereof. Fig. 25 is an elevation of the outbearing for the elevator-operating shaft, which coacts with the standard shown in Figs. 22, 23, and 24.

Like parts are designated by the same characters and symbols of reference in all the various figures.

The object of this invention is the production of a highly efficient, serviceable, durable, and convenient machine for use in open cuts, trenches, tunnels, mines, and other low and confined places for picking up the loose material therein, and elevating and conveying the same back of the machine and depositing said material in cars placed in the rear of said machine, said cars to be removed by either manual labor, motors, or other suitable means. Heretofore, this loose material has been extensively loaded on cars or other conveyances in mines, tunnels, trenches, &c., by manual labor, and almost exclusively so in tunnels and mines, thereby making the removal of the dug, blasted, or otherwise loosened material a very costly and slow operation. Owing to the confined and limited space in which the removal of this loosened material must be performed, such removal is, at best, but slow, and retards the operation of the miners, diggers, and other operators to such an extent as to materially increase the cost of mining, tunnel-blasting and similar operations. Owing, furthermore, to the time consumed in the removal of this loosened material directly behind the miners, the gases resulting from the blasting and confined in the interstices between the loosened material, contaminate the air, especially in tunnels and mines, to such an extent as to cause very serious inconveniences and much physical suffering to the operators, all of which would be avoided were the loosened material removed from the mines as fast as the same is made.

My present machine has demonstrated, especially in the driving of the waterworks tunnels near Yonkers, N. Y., through granite, that it is capable of removing the blasted material much faster than it is made, which is of the greatest importance to the contractors, and reduces the cost of mining, and the removal of the debris, and the sufferings of the miners to a minimum.

20, in the drawings designates a truck having a horizontal platform 21, which is suitably flanged and ribbed to stiffen the same. This truck, as shown, is a structure, preferably a steel casting, of inverted pan shape, the sides 12, 12$^a$, and the ends 13, 13$^a$, of which constitute the said flanges, while the longitudinal members 14, Fig. 7, and transverse members 15, Fig. 6, are the strengthening-ribs heretofore referred to. This truck is supported on rear propelling-wheels 22, 22, and front steering-wheels 23, 23, the former being fixed to a transverse horizontal shaft 25, that is rotatively mounted at its ends in bearings 26, 26, formed in the side-walls 12, 12$^a$, at the rear end of the truck, as shown in Fig. 7.

The steering wheels are mounted on short, horizontal stub-axles 28, 28, which are pivoted, automobile-fashion, by means of vertical pivots 29, 29, to brackets 30, attached to, and extending laterally from, the forward sides of the truck; the said axles being formed at their inner ends to provide vertical hubs 32, which fit between the upper and lower arms of the brackets 30; said hubs and brackets being vertically apertured to receive said pivot-studs. The said stub-shafts are connected with a suitable steering-device which will be hereinafter described.

The object of forming the truck-body in the shape of an inverted pan is to afford spaces, and axle-bearings for the rear-wheels within said truck-body, it being essential that the entire machine is built as low as possible, owing to the mostly very limited height of tunnels and mines in which the machine is required to operate.

35, designates a horizontally swinging turn-table mounted on the truck-platform. It is pivoted at its rear end, and at one side of its longitudinal center line, to the rear end and at the corresponding side of said truck, the object for which is to afford space at the opposite side of said turn-table for a motor and for a run-board upon which the operator of the machine takes his position, it being borne in mind that the limited space within which the machine is usually operated, also limits the width of the machine. For this reason, the turn-table is also formed in the shape of an inverted pan, to afford space for those parts of the operating mechanism hereinafter to be referred to.

36, designates, as a whole, a boom supported upon a suitable frame that rises from the turn-table in such manner that the boom may be swung horizontally when the turntable is rotated from side to side, and vertically at its forward end, by means farther on specifically described.

Upon the boom 36 there is mounted a pick-up and elevating device comprising, in general terms, a series of buckets 38, which are attached to two endless link-chains or belts 39, at spaced intervals, said link-chains being trained over sprocket-wheels 40, 41, respectively, mounted on shafts 42, 43, at the forward and rear ends of the boom respectively. The shaft 43 constitutes a driving-shaft, and the sprockets 41 are fixed thereto. This shaft 43 is rotatively mounted at its ends in bearings 44, 44, which are attached to, and project rearwardly from, the superstructure carried by the turn-table. The sprocket-wheel shaft 42 is fixedly mounted at its ends in bearings 46, 46, formed on chain-tensioning brackets 47, 47, fixed to the forward end, on the outsides of the boom, and the sprocket-wheels 40, which in fact are idler sprocket-wheels are rotatably mounted upon the fixed shaft 42, in order to afford a certain degree of flexibility to the link-belts should one or the other of the buckets meet with abnormal resistance when in operation.

A take-off device is pivotally connected to the turn-table, and includes, in general terms, an endless conveyer-belt 48, which is trained about front and rear drums 49, 50, respectively mounted in a frame, comprising two, preferably channel-bars 51, in spaced relation, the forward portions of said bars being downwardly bent to locate the pivotal connection of said frame sufficiently low to avoid interference with guard-plates hereinafter to be described, which guard-plates are secured to the rear-members of said superstructure. These two channel bars are transversely connected at spaced intervals, and at their forward ends, to a cross-bar 55, which bar carries medially a vertical pivot 53, which engages a pivot-bearing 53ª, formed in a block 54, attached to, and extending rearwardly from, the turn-table, the said pivot 53 being bolted, or otherwise secured to, and depending from, said cross-bar 55. At the ends of this cross-bar 55, there are secured upwardly extending standards 56, in which are mounted the opposite ends of a shaft 57, which carries the forward take-off conveyer-drum 49. This shaft 57 constitutes a pivot about which the take-off conveyer-frame has a limited vertical swinging movement to enable the machine and take-off frames to adjust themselves to uneven surfaces over which they pass. The pivotal connection afforded by the vertical pivot 53 permits the forward end of said frame to swing laterally with the rear end of the turn-table and maintains the receiving or forward end of the take-off conveyer directly beneath the dumping buckets. The cross-bar 55 is located high enough in the bracket 54 to swing over the turn-table rear-end, when necessary, as indicated in dotted lines in Fig. 19. The shaft 60 which carries the rear-drum 50 of the take-off conveyer is a driven shaft to which power is applied to move the endless belt 48. The rear end of the take-off conveyer-frame is supported a suitable distance above the floor or supporting surface, by means of a frame-structure designated, as a whole, by 61, to permit cars being run under the rear-end of the conveyer that are to receive the picked-up material.

Referring now to the details of construction of the turn-table and its boom-supporting frame, and the manner of mounting the turn-table on the truck, and mounting the boom on said frame, these parts are made, as follows: The turn-table 35, as already stated, and as shown in Figs. 6, 7, 8, and 9, and in detail in Figs. 19 and 20, is made in the form of an inverted pan of which the platform 31 forms, as it were, the bottom, upon which parts of the machine are mounted, and the side-walls 33, 33ª, and the end-walls 34, 34ª, form downwardly-pending strengthening-members. In the top-surface of this turn-table there is formed a depression or recess $a$, best shown in Figs. 19 and 20, of suitable depth, from the bottom $a^1$ of which projects, downwardly, a tubular boss, 65, the cylindrical bore $a^2$ of which engages the correspondingly formed cylindrical pivot 66 projecting upwardly from the truck. Adjacent, and forward of this depression $a$, there is a further recess or depression $b$; and forward of this latter recess there is still another recess $d$, from the bottom of which depends a tubular boss 78, the bore $d^1$ of which forms a bearing for a vertical shaft 77, passing through said bore and having at its upper end a bevel wheel 79, entirely located in the recess $d$ together with the lower halves of two opposing bevel-pinions 81, engaging said bevel wheel 79 at diametrically opposite points. Forward of the recess $d$ there is, finally, a depression $e$, which is constructed to receive part of the boom-lifting device hereinafter to be fully described. The side-walls of all these recesses and depressions form strengthening members for the turn-table, together with a longitudinal centrally located rib 27, and transverse ribs 27ª, 27ᵇ, and 27ᶜ, as clearly indicated in Figs. 19 and 20, and also in other figures of the drawings.

The depressions and recesses in the top of the turn-table are all located, with their longitudinal center line, at one side of the longitudinal center line of said turn-table; and running from the rear end thereof forwardly to the forward depression $e$, there are, in the top surface of the turn-table, a series of semi-circular depressions, $f$, $f^1$, $f^2$, and $f^3$, which form the lower halves of bearings 83, for a main transmission or jack-shaft 82, in conjunction with bearing caps of usual construction, located thereon, so that the lower half of said main transmission shaft 82 lies below the upper surface of the turn-table.

Between the boss 65 on the turn-table, and an opposing shoulder at the lower end of the pivot on the truck, there are interposed a plurality of anti-friction bearing-devices, consisting, preferably, of washers 67, as illustrated in Fig. 6. The forward end of the turn-table is supported on a plurality of rollers 69, Figs. 1, 4, and 6, which are mounted in the truck. These rollers are made of rather large diameter, for obvious reasons; and in order not to increase the space between the truck-platform and the turn-table beyond the absolutely-necessary distance, the truck-platform is apertured at the required places occupied by said anti-friction wheels 69, as shown at 16 in Fig. 6, and the bearings 17, and their caps 18, for the journals of said antifriction rollers are placed below the upper surface of the truck-platform so that but a portion of the upper halves of said antifriction rollers project above the upper surface of the truck-platform. These rollers 69 are arranged in an arc concentric to the pivotal axis of the turn-table and engage an arcuated, downwardly-facing track 70, formed on the lower, forward end of the turn-table.

75 designates a forwardly-facing curved rack which is fixed to the upper surface of the truck between the bearing-rollers 69 and the pivot-stud 66, and is arranged concentric to the axis of said stud (Figs. 4, 6, 8, and 9).

76 designates a pinion which meshes with said rack 75, and which is fixed to the lower end of the short vertical shaft 77, that extends upwardly through the bore $d^1$ in the boss 78 in the turn-table. This shaft 77, carries at its upper end the horizontal, beveled gear-wheel 79, which is entirely located in the depression $d$ of the turn-table, and which meshes with the two opposing bevel-pinions 81, that are mounted to normally rotate freely on the main transmission shaft 82, as already stated, said main transmission shaft being rotated by a motor 85, located at one side of the turn-table in a depression $i$, therein, the shaft 86, of said motor being arranged transversely over the main transmission shaft and provided with a worm 87, which meshes with a worm-wheel 88, fixed to said main transmission shaft, the lower half of said worm-wheel 88 occupying the recess $b$ in the turn-table, said recess forming a lubricant-receiver for the worm-gearing, said worm-wheel having a cover 89, to protect the worm-gearing, said cover being removably fastened to the upper surface of the turn-table over the recess $b$, as shown in the drawings.

The bevel-pinions 81 are designed to be separately locked to the main transmission shaft to rotate the bevel-wheel 79 in one direction or the other and thereby swing the turn-table in the direction desired, by means of a clutch 90, which is splined to said shaft and is slidable toward and from the pinions 81. The clutch 90 is shifted on the main transmission shaft through the medium of a horizontal rock-shaft 93, located transversely above the main transmission shaft and mounted in bearings 94, 94, rising from the turn-table, and preferably formed integrally therewith. The rock-shaft 93 has at its outer end, at one side of the turn-table, a hand-lever 95, by which it may be rocked; and it carries between its ends a shifter-yoke 97, by which the clutch 90 is engaged in the familiar manner of such longitudinally movable, double face, clutches.

Referring now to the driving connection between the motor 85 and the rear driving-axle 25, whereby the machine is advanced toward, and retracted from, the work under its own power, said parts are made as follows: 200, Figs. 4, 6, and 7, designates a vertical shaft that extends through, and has rotative bearing in the bore $66^a$, of the pivot-stud 66 of the truck. This shaft 200 is provided at its lower end with a bevel-pinion 201, that meshes with a bevel-gear wheel 202, fixed to the rear axle 25. At its upper end said shaft 200 is provided with a horizontal bevel-gear wheel 204, that meshes with two opposing bevel-pinions 205, 205, which are loosely mounted upon the main transmission shaft 82. These two bevel-pinions are constructed to be separately locked to the main transmission shaft to transmit power to the vertical shaft 200, and through the bevel-gearing below, to the propelling-wheels 22, by a clutch 207, that is also splined to the main transmission shaft and slides longitudinally thereon between said two bevel-pinions 205. Thus, either of the bevel-pinions may be locked to the main transmission shaft, whereby the driving axle 25 may be rotated in either direction to advance or retract the machine, as described. The clutch 207 is operated by a shifter-yoke 209, fixed to a short rock-shaft 210, arranged transversely above the main shaft and mounted in bearings 211, 211, rising from the turn-table. This rock-shaft is provided, at one end, with a crank-arm 212, which connects by a link 213, with a hand-lever 214, by which the shifter-yoke may be actuated. As shown in Figs. 5 and 9, the forward end of the link 213 is connected with an upstanding crank-arm 216, carried by the inner end of a tubular rock-shaft 217, the outer end of which carries said hand-lever 214. This tubular shaft has bearings on the rock-shaft 93, the object being to bring the two hand-levers 214 and 95 in close proximity to each other.

Mounted upon, and rising from, the turn-table is a superstructure or frame, to the upper end and to the rear of which is pivoted the rear end of the boom, said boom extending forwardly and downwardly beyond the forward end of the truck. This superstructure or frame comprises front and rear posts 100, 101, braced by diagonal members $100^a$, the said posts being attached at their lower ends to the turn-table by angle-pieces 102, 102, and are rigidly connected at their tops by transverse girders 103, and longitudinal members 104. The bearings 44 already mentioned are formed integral with brackets 45, which are secured to the rear posts of the superstructure.

The boom 36, comprising two vertically-arranged plates 105 in spaced parallel relation, connected at several places by transverse web-plates 107, and at the top margins by diagonals 108. These side-plates of the boom are furthermore stiffened by angle-bars 109, applied at various places to the outside thereof. These plates are provided at their inner upper and lower edges with stiffening angle-bars 110, $110^a$, which bars also form tracks on which run antifriction rollers 111, which are incorporated in the bucket-chain 39. Above these lower angle-bars $110^a$ there are further angle-bars 106, Figs. 1 and 10, in parallel spaced relation, to afford guiding grooves for the antifriction rollers at the slack, or lower run of the elevator link-chains to prevent the buckets from being lifted when they are in picking operation.

At the rear end of the boom there are provided hangers 113, 113, which are secured to the sides of the boom. These hangers have bearings engaging tubular cylindrical side-pieces 112, upon which the boom oscillates, and not directly upon the shaft 43. This construction avoids undue weight and friction on the shaft 43 and permits this shaft to rotate freely in the bearings 44.

Means are provided for raising and lowering the forward end of the boom about its horizontal pivots, said means being carried by the turn-table and engaging the boom approximately midway between its ends. These means comprise two screw-shafts 118, 118, located, one on each side of the boom, said screws engaging nuts 119, 119, carried by the side-plates of the boom, as illustrated in Figs. 1, 3, and 10. These nuts have trunnions 120, which extend inwardly through openings in the side-plates 105, into bearing blocks 121, 121, attached to the inner sides of said plates, said trunnions being fixed from endwise movement in said bearing-blocks by means of pins 122, passing through the trunnions at their inner ends. The lower ends of these screw-shafts are cylindrical; and at a suitable distance above these lower ends there are collars 123, which sustain the screw-shafts in rotatively mounted brackets 125, having vertically disposed sleeves 124 engaging the lower ends of said screws 118, and horizontally disposed, comparatively long, sleeves 126, which engage a shaft 127, extending horizontally across the upper side of the turn-table at its forward end. Fixed to the lower end of each screw-shaft there is a bevel-pinion 131; and fixed to the horizontal shaft 127, and at each end thereof, are bevel-pinions 132, 132, engaging said bevel-pinions 131, thereby imparting rotative motion to said screw-shafts in the following manner: Loosely mounted on the horizontal shaft near its longitudinal center there are opposing bevel-pinions 135, 135, which mesh with a pinion 136, fixed to the forward end of the main transmission shaft 82. These two bevel-pinions are constructed to be separately locked to the main shaft by means of a double-face clutch 138, longitudinally movable upon the transverse shaft 127, to which the clutch is splined in the usual manner. This clutch is actuated by a shifter-yoke 139, that is fixed to the upper end of a short vertical shaft 140, Figs. 5 and 6, mounted in the front end of the turn-table in a bearing $h$, Figs. 19, 20. The lower end of this shaft carries an arm 141, which connects, by a link 147, with a hand-lever 148, pivotally mounted on the side of the turn-table on which also the hand-levers 214 and 95 are located. By shifting the clutch 138 in one direction or the other by the hand-lever 148, one or the other of the bevel-pinions 135 is locked to the shaft 127, and the boom-hoisting and lowering-screws 118 rotated in a corresponding direction, and the boom raised or lowered at its forward end accordingly. When the clutch-member 138 occupies its central position, shown in Fig. 10, the boom-hoisting screws are disconnected from said shaft 127.

As heretofore stated, there is in the upper surface of the turn-table a forwardly located depression or recess $e$, this recess being occupied by the lower halves of the three bevel-pinions 135, 135, and 136, and part of the shaft 127. Adjacent to this depression $e$ there are semicircular depressions $q^6$, $q^7$, in the turn-table upper surface, and at a proper distance from these depressions are further depressions $q$, and $q^1$, respectively, which, in conjunction with suitable caps, form bearings 129, for the shaft 127, while adjacent to the recesses $q$, $q^1$, there are recesses $q^5$, $q^4$, through which the shaft 127 passes; and between these latter recesses and the semicircular bearings $q$, $q^1$, there are still further recesses $q^3$, $q^2$, which receive the lower halves of the bevel-pinions 132.

The bucket-chain drive shaft 43 at the rear end of the boom is driven from the motor 85 in the following manner: In the rear of, and parallel with, the motor shaft 86, and mounted in bearings 156, 156ª, rising from the top of the turn-table there is a countershaft 155, carrying at one of its ends a spur-gear wheel 158, which meshes with a pinion 159, fixed to the outer end of the motor-shaft, portion of the lower half of said spur-gear 158 occupying a depression $k$, in the rear end of the turn-table. At the other end of the shaft 155, and loosely mounted thereon, is a sprocket-wheel 160, Figs. 3 and 5, which is connected to a sprocket-wheel 162, fixed to the outer end of the drive-shaft 43, by a link-belt 161. The hub of the sprocket-wheel 160 is constructed to be locked to the countershaft, by a clutch 165, splined to, and shiftable endwise of, the shaft 155. The outer end of this shaft carries a collar 166, which limits the outward movement of the clutch-member 165. This clutch is operated by a shifter-lever 167, pivoted to a bracket 168, secured at the side of the turn-table, as illustrated in Fig. 7, in an obvious manner.

The driving-gear between the motor and the bucket-chain is provided, preferably, with a friction-coupling to prevent an overload being thrown on the motor and an undue stress being thrown on the driving-connection and bucket-chains in case a bucket should encounter an immovable object, or a mass of material too great to be readily raised by the buckets. This friction coupling includes the following elements: The motor shaft 86 is made in two parts and the worm 87 is formed, preferably integrally, on the inner end of a sleeve 91, which loosely surrounds the section of the motor-shaft next to the motor. This sleeve is formed at its outer end into an enlarged shell 170, to receive the elements of the friction-connection, in conjunction with friction-elements on the second section of the motor-shaft. This friction-coupling, designated as a whole by the reference-numeral 171 in Figs. 5 and 8, is of a well-known type and needs, therefore, no further description. The bucket chains 39, consist of short links 175, shown best in Fig. 3, which are arranged side-by-side in pairs, in overlapping relation at their ends, to the links of adjacent pairs. They are loosely connected by means of pins 176, 177, Figs. 1 and 3, the former, or those in line with the buckets being short, and the latter, or those between the buckets, being of such length as to extend from one chain to the other, the object of which will farther on appear. The antifriction bearing-rollers 111 of said chains are rotatably mounted on the link-pins between the ends of the overlapping links, said antifriction rollers spreading the links to provide spaces for the teeth of the sprocket-wheels 41 on the driving shaft 43. The sprocket-wheels 40 at the forward end of the boom, are, however, of special construction. Thus, the comparatively narrow teeth of these sprocket-wheels have in their outer ends arcuated depressions 37, the curvature of which conforms to the periphery of the antifriction rollers 111, the faces of these two sprocket wheels being wider than the widest width of the link chains to guard against the link-chains slipping from the sprocket-wheels in case lateral pressure or force should act on the buckets to deflect the link-chains from their normal course. The antifriction rollers of the upper laps, or pulling side of the bucket-chains, are traveling upon the upper angle-bars 110, while the rollers 111 of the lower, or slack side thereof move on the lower angle-bars 110ª, between these bars and the bars 106, whereby the weight of the buckets and the load carried thereby are borne by the upper angle bars, and the strain upon the buckets when picking up a load, received by the angle bars 106. Both the angle-bars at the lower margins of the boom have their ends curved, as indicated by the reference numeral 173, to facilitate the entry of the antifriction rollers upon the lower track-flanges.

The construction of the buckets is most clearly shown in Figs. 1, 3, and 15, and is made in the following manner: Each bucket comprises two end-walls 182, 182, a curved bottom or scoop-side, 183, and a top or load-bearing side 184. These buckets are open at their forward side and are closed at their rear side. The curved, scoop-sides of these buckets are outwardly curved away from the load-bearing sides 184, which latter are made straight as shown, and substantially parallel with the path of movement of the buckets. The curved or scoop-side of the buckets are on the lower sides thereof, while the buckets are moving forwardly with the slack side of the bucket-chains, and in this position the buckets travel with their open sides directed forwardly to scoop the material into the buckets as each bucket reaches and passes over the forward end of the boom. As each bucket turns over and upwardly around the forward end of the boom, the bucket is inverted and the material scooped up is shifted to the flat load-bearing side 184 thereof, to be carried backwardly on the upper laps of the chains.

The material picked up by the buckets is dumped when the latter turn at the rear end of the boom, and in order to assist them in retaining the load while traveling upwardly on the boom, there are formed at the open sides of the buckets on the load-bearing sides thereof, narrow, inclined lips 185. The curvature of the scoop-sides 183 of the buckets is such that the nose of each bucket will approach the horizontal surface from which the material is being picked up with the curved nose substantially parallel to the plane of said surface, or at least without being at such a sharp angle thereto as would tend to cause the nose of the scoop-side of the bucket to dig or scoop into the surface. Furthermore, the curvature of the scoop-sides of the buckets is such that said curved sides will not tend to confine the material in the buckets in a manner to throw the material forwardly as the buckets are passing through their discharging or dumping position at the rear end of the boom.

The scoop or load-bearing walls of the buckets may be made of a single or integral plate, and said walls, as well as the end-walls are reinforced by suitably-applied stiffening-bars, 186. And in order to facilitate the entrance of the buckets into the material to be picked up, I prefer, when necessary, to provide the noses of the buckets with spuds 187 of approved construction.

The buckets span the spaces between the chains 39, and may be attached to said chains in any suitable manner. In the preferred embodiment of this invention, the attachment of the buckets to the chains consists of plates 188, riveted one to each end-wall of each bucket, and on said plates are formed link-bars 175¹, constituting part of the chain, said link-bars being duplicates of the links on the chain except that they are integrally formed with the bucket-attaching plates 188.

In order to prevent material which may fall from the buckets as they pass rearwardly along the upper side of the boom, from dropping downwardly through the hollow boom and onto the machinery beneath, I provide a series of aprons 190, which extend from bucket to bucket and fill the spaces between the laterally-separated chains. Each apron is attached at one of its ends to the rear or closed side of the bucket, and at its other end to the front margin of the load-bearing wall at the open side of the adjacent bucket. Intermediate the buckets the aprons overlie and are supported upon the long pivot-rods or pins 177 of the chains, as clearly illustrated in Fig. 1.

Again referring to the take-off frame, the channel-bars 51 carry upper and lower supporting rollers 243, 244, respectively, to support the upper and lower laps of the take-off conveyer belt 48. The lower rollers 244 are mounted on shafts supported in bearings 245, attached to the lower flanges of the channel-bars 51, a sufficient number of these rollers being provided to properly support this lower lap of the belt. The upper lap of this conveyer belt 48 is preferably supported upon relatively short rollers 243, the trunnions of which are mounted in upright standards 246 secured to the upper flanges of the longitudinal channel-bars 51. These rollers 243 are arranged in the arc of a circle to give a depressed, trough-like cross section to the upper lap of the conveyer belt, as clearly shown in Fig. 12. The bearings 246 for these short rollers rise from, and may be formed integrally with, bars 241, that constitute the transverse connections for the channel bars 51 already referred to. This arrangement of the conveyer-belt prevents the material from falling off the sides of the conveyer-belt. And in order to prevent the material from falling off the sides of this belt at the place where it is dumped thereon from the buckets, I provide guard-plates 250, 250, arranged vertically, one at each side of the conveyer-belt. Such guard-plates may be attached, as by means of angle-pieces 251, Figs. 2 and 5, to the rear posts 101 of the turn-table superstructure, and they afford means for the attachment of flexible aprons 253, 253, said guard-plates being cut away at their rear lower margins as indicated by the reference numeral 252, in Fig. 2. These aprons lie at their lower margins on the transversely-curved upper surface of the conveyer-belt, as illustrated in Fig. 12; and they extend below the lower margins of the guard-plates and fill the space between the lower margins and that portion of the conveyer belt that is inclined upwardly and rearwardly from the front conveyer-belt supporting-drum 49.

In order to prevent the material from sliding forwardly off the inclined upper lap of the belt at the forward end, a rearwardly and downwardly-inclined guard-plate 254, is arranged over said upper lap above the drum 49, with its lower edge closely adjacent to said lap. This inclined guard-plate extends between the rear posts of the turntable superstructure and may be attached thereto in any suitable manner.

The conveyer-belt supporting-frame is supported approximately in its middle by front and rear uprights or posts 256, 257, respectively, preferably connected by diagonal members 266, which are secured to the longitudinal channel-bars 51, preferably by bolts 258, and they are carried upon runners or shoes 255, 255, arranged parallel with the normal path of movement of the machine.

The take-off conveyer belt is preferably operated by a separate motor 260, supported at the top of the frame 61 upon longitudinal girders or bars 267, the motor-shaft 261, supported at its outer end in an upright standard 259, being connected by a worm-gear connection 268, to an intermediate shaft 262, that carries a sprocket-wheel 263, about which, and a sprocket-wheel 264, on the conveyer-belt drive shaft 60, is trained a link-belt 265.

Referring now to the mechanism for steering the truck, the same is best illustrated in Figs. 4, 16, 17, and 18, and comprises the following elements: The hubs 32 of the stub-axles or spindles 28 are provided with rearwardly-extending crank-arms 218, 218, that are connected by a link 219, extending transversely beneath the truck. One of these hubs 32 has also a forwardly extending crank-arm 220, to the forward end of which is pivoted a horizontally arranged yoke 222. This yoke carries, pivotally mounted at its end remote from the arm 220, a screw-threaded nut 223, which receives, and is engaged by a shaft 224, having portion of its length externally screw-threaded to engage said nut 223, the remainder of said shaft being cylindrical and rotatably mounted in bearings 225, 225. Fixed to this latter portion of said shaft between the bearings 225, 225, is a notched wheel 227, similar to a ratchet-wheel. Arranged at the side of this wheel 227 there is rotatably mounted upon said shaft a hand-lever 230, which carries a spring-pressed pawl 231, that is located in the plane of said notched disk and is adapted to engage the notches in the periphery of said disk. The said pawl consists of a bar that extends through apertured guide-lugs 232 at the side of the hand-lever next to said disk, and said pawl is normally pressed toward said disk by a spiral spring 233, interposed between one of the guide-lugs and a transverse pin 235, passing through the pawl. The end of the pawl next to the disk is beveled at 236, Fig. 17, so that in swinging the hand-lever 230 with its pawl in one direction the pawl will slip out of the notches and over intermediate teeth, and when moved in the opposite direction, will rotate the notched disk in the same direction; but when the pawl is rotated halfway around, the operations of the hand lever will rotate the notched disk in the opposite direction. This rotation of the notched disk causes the nut 223 on the shaft 224 to move laterally, and through the medium of the yoke 222 and crank-arm 220 to swing the connected axle-spindles and the wheels thereon in the corresponding direction and thus steer the machine in the direction desired.

It will be manifest that the screw-threaded connection of the shaft 224 with the nut 223, serves to hold the steering mechanism rigidly in any adjusted position; and I may, in this connection state that this machine is not intended for traveling by its own power any great distances upon streets and roads, so that the steering-mechanism heretofore described will not be called upon for frequent manipulation, and when needed, may be handled by an attendant walking in front of the machine. For this reason, no provision is made to bring the steering-lever 230 within easy reach of the operator although all the other hand-levers by which the actions of the various operating mechanisms are controlled, are clustered together and may be easily reached by the operator without changing his position on the running-board 215.

In view of the fact that metallic link-belts are subject to elongation caused by the wear in the eyes of the links and of the pins that connect the links, means are provided to take up any slack in the elevator belts on the boom. These means, heretofore designated by the reference-numeral 47, include, as shown in Figs. 1 and 11, two longitudinally-slotted plates, one on each side of the side-plates 105 of the boom, and secured to the forward end thereof by bolts 269, passing through said plates and slots therein. The bearings 46 for the forward sprocket-shaft 42 are formed, preferably integral with the plates 47. Each of these plates has a rearwardly-projecting, fixedly secured, adjusting screw 270, which moves freely in an abutment-block 271, secured to the side-plate of the boom in the rear of the plate 47. Lock-nuts 272, 273, upon said screw at the sides of said abutment afford means for moving the slotted plate 47 longitudinally on the boom. Thus, by slacking up the bolts 269, and then slacking up the respective lock-nuts on one side of the abutments and screwing up the opposite lock-nuts, the plates may be pulled or pushed backward or forward, as the case may be, and the tension of the elevator link-belts adjusted in an efficient manner.

I now desire to call attention to the fact that under ordinary working conditions, the boom swings at its forward end seldom through a horizontal arc greater than 20 degrees to either side of the longitudinal line of the truck. It follows that the horizontal movement of the boom at its rear end, compared with that of the forward end, bears the same ratio as the distance from the pivotal point of the turn-table to the forward end of the boom, bears to the distance from this pivotal point to the rear-end pivotal point of the boom, which is, therefore, very slight; and that the take-off device that is pivoted at its forward end to the rear end of the turn-table moves in unison with the rear end of the turn-table and in the same direction, so that the material dropped from the rear end of the boom always falls fairly and squarely upon the conveyer-belt 48; and that one or the other end of the cross-bar at the forward end of the take-off device seldom reaches over the rear end of the turn-table.

Attention is called to the fact that by pivoting the turn-table at its rear end to the rear end of the truck, and locating the supporting anti-friction rollers near the forward end thereof, the track for these rollers being at and under the forward end of the turn-table, I attain the important result of securing a very long supporting base for the turn-table without increasing the length of the same, and that the tendency of the turn-table to lift at its rear end under the influence of the weight of the superstructures thereon, is entirely avoided. By locating the elevating and lowering device for the boom at the extreme forward end of the turn-table, which device sustains the major portion of the weight of the boom and the load thereon, there is but a slight tendency, if any, of the boom to lift at its forward end, and cause the buckets to slip over or recede from the material which the buckets are to pick up, and that this result is accomplished without being compelled to lock, brace, or otherwise fasten the machine down to the ground, as is frequently necessary with other loading machines. Attention is also again called to the fact that by giving to the truck and the turn-table the form of an inverted pan, I attain the very important result of attaining a very low machine since many of the operating parts thereof can be, and are located in the spaces and top-surfaces of these two parts, so that this machine is especially well adapted for use in mines, tunnels, and other low and confined places.

By the term "motor" hereinbefore employed to designate the motive power which operates the moving parts, I desire to include any suitable machine capable of developing the necessary power, and which may include electric, pneumatic, steam, and internal combustion engines of known and approved design.

In the drawings, Figs. 1 and 2, I have shown the superstructure carrying the pivot-bearings for the boom, upwardly extended above the highest point reached by the buckets. This extension may, however, be omitted and the longitudinal girders 104 lowered accordingly, and the transverse girders 103 omitted, in all cases where the overhead room in a tunnel or mine is limited.

While this machine is primarily designed for operation in tunnels, mines, and trenches, for loading the loose material, it is evident that it may also be successfully employed for picking up, and loading material in any other place, and that where sand and other comparatively loose material is to be dug and removed, this machine will be capable of doing the digging and picking up of the loose material much cheaper than it can be done by hand labor. And while I have described the various details of the machine with considerable particularity, it is to be understood that many of the structural details are susceptible of considerable variation without departure from the scope of this invention. I am also aware that some of the details of construction hereinbefore described are not claimable in this present application. These will, therefore, be presented in separate applications for Letters Patent, as divisions carved out of this parent application.

I shall now explain the importance of the coöperation of the rotatable turn-table, the propelling means of the machine, the boom-raising and lowering means, and the moving pick-up and elevating mechanism on the boom, by assuming that in picking up loose material, an object, such as a rock, boulder or similar matter is met which is too long to be picked up by the bucket, or so tightly embedded in the ground as to prevent its being lifted. In this case the operator may stop the picking up mechanism and turn the forward end of the boom slightly to one side of the object to be lifted and start the propelling device forwardly to push or turn the object so that the bucket may pick it up, and he may do this repeatedly if necessary to accomplish the object in view, or to loosen the object sufficiently so that it can be picked up. Or he may lift the boom at its forward end to pass over the obstruction to pick up material behind the same to free the obstructing object. It will thus be seen that all of the movements of the machine may be required to be performed, some at the same time, and others successively to pick up the material to be loaded. It will also be noticed that the operator standing at one side of the machine has the forward end of the boom constantly in full view and can direct the various movements of the machine without changing his position on the running board, and that all of these various movements may be brought into and taken out of action without stopping the motor that supplies the power for performing these various movements or reversing the same.

Having thus fully described this invention I claim as new and desire to secure to me by Letters Patent of the United States—

1. In a machine for picking up and loading loose material, the combination, of a wheeled truck, a pivot projecting from said truck upwardly, a horizontally swinging turn-table supported on said truck-pivot at one end, a boom pivotally supported at its rear end upon said turn-table to swing vertically at its forward end only, means constructed to directly and positively connect the boom to the forward end of the turn-table, whereby the bulk of the weight of the turn-table and its appurtenants is added to the weight of the boom to resist vertical movement of the boom at its forward end in picking-up operation, a traveling pickup and conveying device carried by said boom, a motor, operative connection between said motor and said turn-table to swing said turn-table on its pivot, the pivotal point of said turn-table being at its rear end and at the rear end of said truck, said turn-table being supported at its forward end upon said truck, there being no support for said turn-table at its rear end beyond said pivot-support.

2. A machine for picking up and loading loose material, including, in combination, a wheeled truck, a pivot on said truck and projecting upwardly therefrom, a horizontally swinging turn-table supported on said truck-pivot at one end, a boom pivotally supported on said turn-table to swing vertically, a traveling pickup and conveying device carried by said boom, a motor, operative connection between said motor and said turn-table to swing said turn-table on its pivot, the pivotal point of said turn-table being at its rear end and at the rear end of said truck, said turn-table being supported at its forward end upon said truck, there being no support for said turn-table at its rear end beyond said pivot-support, the pivotal point of said turn-table and the pivot on said truck being at one side of the longitudinal center line of both, the turn-table and the truck.

3. A machine for picking up and loading loose material, including, in combination, a wheeled truck, a pivot on said truck and projecting upwardly therefrom, a horizontally swinging turn-table supported on said truck-pivot at one end, a boom pivotally supported on said turn-table to swing vertically, a traveling pickup and elevation device carried by said boom, a motor, operative connection between said motor and said turn-table to swing said turntable on its pivot, said turn-table being of inverted pan shape, said operative connection including a main transmission shaft located longitudinally on said turn-table, gearing to connect said main transmission shaft to said motor, gearing on said main transmission shaft and a gear-wheel connected to said gearing, and means connecting said gear-wheel to the said truck, there being in said turn-table depressions and recesses constructed to receive said main transmission shaft, said gearing, and said gear-wheel.

4. A machine for picking up and loading loose material including, in combination, a wheeled truck, a pivot on said truck and projecting upwardly therefrom, a horizontally swinging turn-table supported on said truck-pivot at one end, a boom pivotally supported on said turn-table to swing vertically, a traveling pickup and elevating device carried by said boom, a motor, operative connection between said motor and said turn-table to swing said turn-table on its pivot, said turn-table being of inverted pan shape, said operative connection including a main transmission shaft located longitudinally on said turn-table, gearing to connect said main transmission shaft to said motor, gearing on said main transmission shaft and a gear-wheel connected to said gearing, means connecting said gear-wheel to said truck, there being in said turn-table depressions and recesses constructed to receive said transmission shaft, said gearing, and said gear-wheel, and a clutch on said main transmission shaft constructed to lock the gearing separately to said main transmission shaft.

5. In a machine for picking up and loading loose material, the combination, of a truck, propelling wheels on said truck, an upstanding cylindrical pivot on said truck, said pivot being located at the rear end of said truck, said truck having a body of inverted pan shape, carrying rollers near the forward end of said truck the major portions of said carrying rollers being located in and below the upper surface of said truck, a turn-table, said turn-table being of inverted pan shape, a tubular boss in said turn-table projecting downwardly from the inner top surface of said turn-table and engaging said upstanding cylindrical pivot, said tubular boss being located at the rear end of said turn-table, a track at the under side of said turn-table and located at the forward end thereof and coöperating with said carrying rollers, there being in the top surface of said turn-table a series of depressions and recesses, a motor on said turn-table, a main transmission shaft located longitudinally on said turn-table connected to said motor, and shafts and gearing connected to said main transmission shaft, constructed to rotate said turn-table, the major portions of said shafts and the gearing being located in said depressions and recesses and in the pan-shaped body of the turn-table.

6. In a machine for picking up and loading loose material, the combination, of a truck, propelling and steering wheels on said truck, an upstanding cylindrical pivot on said truck, said pivot being located at the rear end of said truck, said truck having a body of inverted pan shape, carrying rollers near the forward end of said truck the major portion of said carrying rollers being located in and below the upper surface of said truck, a turn-table, said turn-table being of inverted pan shape, a tubular boss in said turn-table projecting downwardly from the inner top surface of said turn-table and engaging said upturned cylindrical pivot, said tubular boss being located at the rear of the turn-table, a track at the underside of said turn-table and located at the forward end thereof and coöperating with said carrying rollers, there being in the top surface of said turn-table a series of depressions and recesses, a motor on said turn-table, a main transmission shaft located longitudinally on said turn-table and connected to said motor, and shafts and gearing connected to said main transmission shaft constructed to rotate said turn-table, the major portions of said shafts and said gearing being located in said depressions and recesses and in the pan-shaped body of the turn-table, the longitudinal center line of said pivot and said depressions and recesses in the top of the turn-table being at one side of the longitudinal center line of said turn-table and said truck, as stated.

7. In a machine for picking up and loading loose material, a truck, propelling wheels on said truck, a cylindrical upstanding pivot at the rear end of said truck, a turn-table, said turn-table being of inverted pan shape there being at the rear end of said turn-table a box-like pending structure affording a recess in said turn-table, a tubular boss depending from the bottom of said box-like structure and engaging said upstanding pivot, a segmental rack on the upper surface of said truck concentric to said upstanding pivot, a series of supporting rollers located near the forward end of said truck there being openings in the platform of said truck wherein said supporting rollers are journaled, the minor portions of said supporting rollers only projecting above the top surface of said truck, there being on the lower forward end of said turn-table a curved track coöperating with said supporting rollers, a further box-like structure depending from said turn-table forward of the said first-mentioned box-like structure, there being a tubular boss depending from the bottom of said last-mentioned box-like structure, a vertical shaft rotatively arranged in the latter tubular boss, a gear wheel at the upper end of said shaft located entirely in the last named box-like structure, a pinion at the lower end of this shaft meshing with said curved rack, and mechanism on said turn-table constructed to rotate said gear wheel in two opposite directions, whereby a very low, narrow, and short truck and turn-table are attained having a comparatively long supporting base, as described.

8. In a machine of the nature described, the combination of a wheeled truck, a turn-table rotatably mounted on said truck, mechanism on said turn-table constructed to pick up loose material at the forward end of the machine and convey the same to the rear end thereof, said latter mechanism being constructed to rotate with said turn-table, and means for rotating said turn-table, said turn-table being an inverted pan-shaped body there being in the top surface of said turn-table body, a series of depressions and recesses the longitudinal center line of which is parallel to but, on one side of, the longitudinal center line of said turn-table and truck, said means for rotating said turn-table including a motor mounted on the turn-table at one side thereof, a longitudinally disposed main transmission shaft connected to said motor, gearing on said main transmission shaft, a gear wheel meshing with said gearing, a clutch constructed to engage said gearing to rotate said gear wheel in two opposite directions, the lower halves of said main transmission shaft, the gearing, and the clutch, and the entire gear wheel being located in said depressions and recesses, a curved rack on said truck, a shaft to which said gear wheel is affixed, and a pinion at the lower end of said shaft meshing with said curved rack.

9. A machine for the purpose specified, including, in combination, a truck, propelling wheels on said truck, a horizontally swinging turn-table supported on said truck, mechanism on said turn-table constructed to pick up loose material in front of the machine and convey it to the rear thereof, and mechanism for moving said machine toward and from said material, said mechanism including a motor, a longitudinally disposed main transmission shaft geared to said motor, gearing at the end of said main transmission shaft, a horizontally disposed gear wheel connecting said gearing, a vertically disposed shaft, and gearing connecting said shaft to the propelling wheels, said turn-table being pivoted on a tubular pivot rising from the truck, the pivotal point being at the rear end of said truck and turn-table, said turn-table being an inverted pan-shaped body, there being in the upper surface of said turn-table depressions constructed to receive said main transmission shaft and a recess constructed to receive the entire horizontal gear wheel and the lower halves of said gearing, said vertical shaft passing through the tubular pivot.

10. In a machine of the nature described, the combination, of a truck, propelling and steering wheels on said truck, a turn-table rotatably mounted upon said truck, means on said truck for picking up loose material in front of the machine and convey the same to the rear thereof, and mechanism for moving said machine forward and backward, said latter mechanism including an inverted pan-shaped truck-body, there being in the depending sides of said truck-body bearings, an axle journaled in said bearings said propelling wheels being fixed to said axle inside of the pan-shaped body, a hollow upstanding pivot at the rear end of said truck-body, a tubular depending boss on said turn-table engaging said hollow upstanding pivot, said turn-table being an inverted pan-shaped body, there being in the top-surface of said turn-table a series of longitudinally-disposed depressions and a recess at the rear end of said turn-table the axial line of which coincides with the axis of said pivot, a motor on said turn-table, a longitudinally-disposed main transmission shaft connected to said motor, gearing on said main transmission shaft, a gear wheel meshing with said gearing, a clutch on said main transmission shaft constructed to engage said gearing to rotate said gear wheel in two opposite directions, a vertical shaft to one end of which said gear wheel is affixed, said vertical shaft passing through said vertically upstanding pivot, a gear wheel at the lower end of said shaft and a gear wheel on said axle meshing with the gear wheel on the lower end of said vertical shaft, the lower half of said main transmission shaft, said clutch, and said gearing, and the entire gear wheel engaging said gearing being located below the upper surface of, and within, said pan-shaped turn-table.

11. A machine for picking up and loading loose material, including, in combination, a wheeled truck, a pivot projecting upwardly from said truck, a horizontally swinging turn-table supported at one end upon said truck-pivot, a boom pivoted at its rear end upon the rear end of said turn-table to swing vertically at its forward end only, a traveling pick-up and conveying device carried by said boom, means constructed to directly and positively connect the boom to the forward end of the turn-table, whereby the bulk of the weight of the turn-table and its appurtenants is added to the weight of the boom to resist vertical movement of the boom at its forward end in picking-up operation, a motor, and operative connection between said motor and said pick-up and conveying device, and mechanism connected to said motor for rotating said turn-table, said turn-table pivot being located at the rear end of said truck, the pivotal point of said turn-table being also located at the rear end of said turn-table.

12. A machine for picking up and conveying loose material, including in combination, a wheeled truck, an upstanding pivot on said truck, a horizontally swinging turn-table supported at one end upon said truck-pivot, carrying means on said truck to support the forward end of said turn-table, a boom pivotally mounted upon said turn-table to swing vertically thereon at its forward end only, a traveling pick-up and conveying mechanism mounted upon said boom, means constructed to directly and positively connect the boom to the forward end of the turn-table, whereby the bulk of the weight of the turn-table and its appurtenants is added to the weight of the boom to resist vertical movement of the boom at its forward end in picking-up operation, a motor and operative connection between said motor and said pick-up, and conveying device, further operative connection between said motor and said turn-table and said truck for rotating said turn-table on said upstanding pivot, said upstanding pivot on said truck being located at the rear end thereof and to one side of the longitudinal center line of said truck, and separate means for independently and conjointly connecting and disconnecting the pick-up and conveying mechanism and the turn-table rotating mechanism.

13. In a machine for picking up and conveying loose material, the combination, of a truck, propelling wheels on said truck, a turn-table rotatably mounted on said truck, a boom pivoted to said turn-table at its rear end and projecting forwardly beyond said truck, pick-up and conveying mechanism mounted on said boom, means for raising and lowering said boom at its forward end and mechanism for separately and conjointly operating said pick-up and conveying mechanism and said truck-propelling wheels, said turn-table and said truck having inverted pan-shaped bodies, there being an upstanding pivot on said truck and a tubular boss depending from the inner top surface of said turn-table constructed to engage said upstanding pivot, said pivot and the pivot-engaging boss being located at the rear end of said truck and said turn-table respectively, there being in the top surface of said turn-table recesses and a series of depressions, said mechanisms for separately and conjointly operating the pick-up and conveying mechanism and the propeller-operating mechanism including a motor on said turn-table, a longitudinal main transmission shaft located in said depressions and operatively connected to said motor, a set of bevel gears loosely mounted on said main transmission shaft, a horizontally-disposed bevel gear wheel located in one of said recesses and in mesh with said set of bevel gears, a vertical shaft connected to said horizontally-disposed bevel gear wheel and passing through said upstanding pivot, a horizontally disposed shaft upon which said propelling wheels are mounted, gearing connecting said vertical and said horizontal shafts, clutch mechanism constructed to engage and disengage said set of bevel gears with, and from said main transmission shaft, there being on said motor a shaft, a gear pinion at one end of said motor shaft, a countershaft, a spur gear wheel on said countershaft connecting with said pinion, a sprocket wheel near one end of said countershaft, belting connecting said sprocket wheel to the pick-up mechanism on said boom, and a clutch on said countershaft constructed to connect said sprocket wheel to and disengage same from said countershaft.

14. In a machine of the nature described, the combination of a truck, propelling and steering wheels on said truck, a turn-table mounted on a hollow pivot rising from said truck, said pivot being at the rear end of said truck, a depending tubular boss on said turn-table engaging said pivot, a boom pivotally mounted at the rear end of said turn-table and projecting forwardly beyond said truck, means at the forward end of said turn-table constructed to raise and lower the forward end of said boom, and means for moving said truck forward and backward, said turn-table being a body having an inverted pan shape, there being in the top surface of said turn-table a series of longitudinal and a series of transverse depressions and a series of recesses, said means for raising and lowering said boom and for moving said truck forward and backward including a motor, a main transmission shaft located in the longitudinal depressions, a pair of gear wheels at the rear end of said main transmission shaft, a horizontal gear wheel located in one of said recesses and meshing with said gear wheels, a vertically disposed shaft passing through said pivot, said gear wheel being fixed to the upper end of said vertical shaft, gearing to connect the propelling wheels to said vertical shaft, a transversely disposed shaft at the forward end of said turn-table located in the transverse depressions therein, a gear wheel at the forward end of said main transmission shaft, gearing on said transverse shaft meshing with the last-named gear wheel, the means for raising and lowering said boom being connected to said forward transverse shaft, and two clutches one of which is constructed to lock the gearing on the main transmission shaft thereto, the other of said clutches being constructed to lock the gearing on the transverse shaft thereto, whereby the boom may be raised and lowered and the machine-propelling means operated conjointly and independently of each other.

15. In a machine of the nature described, the combination, of a truck, a turn-table pivotally mounted thereon, the pivotal point being at the rear end of the truck and at the rear end of said turn-table, propelling wheels on said truck, a boom pivoted at its rear end upon said turn-table to swing vertically, and with the turn-table horizontally, picking up and conveying mechanism mounted on said boom, a motor on said turn-table, means for moving said picking up and conveying mechanism, means for raising and lowering said boom at its forward end, means for rotating said turn-table, and means for propelling said truck, said turn-table being a body having an inverted pan shape; there being in the top surface of said turn-table a series of depressions and a series of recesses constructed to receive portions of said operating means, and clutches whereby any one or more of said operating means may be independently and conjointly, and all of the same simultaneously, operated by said motor, as set forth.

16. A machine for picking up and loading loose material, including, in combination, a truck mounted on wheels, a turn-table pivoted at its rear end to the rear end of said truck, a boom pivotally mounted at its rear end on said turn-table and projecting forwardly beyond said truck, picking up and conveying mechanism on said boom, and take-off mechanism for carrying the picked up and elevated material beyond the rear end of said boom, said take-off mechanism including a frame, said frame being pivotally connected at its forward end to the rear end of said turn-table to swing horizontally therewith, a conveyer belt mounted in said frame, and a motor on said frame connected to said conveyer belt, said take-off frame being supported near its rear end upon members constructed to move longitudinally with said machine and to serve as a pivot for the rear end of said take-off frame.

17. In a machine of the nature described, the combination, of a wheeled truck, a turn-table pivoted at its rear end to the rear end of said truck, vertical posts at the rear end of said turn-table, brackets extending rearwardly from said posts, said brackets having cylindrical tubular pivots, a boom pivoted at its rear end upon said tubular pivots to swing vertically at its forward end, said boom extending forwardly and downwardly beyond the forward end of said truck.

18. In a machine of the nature described, the combination of a wheeled truck, a turn-table pivoted at its rear end to the rear end of said truck, vertical posts at the rear end of said turn-table, brackets extending rearwardly from said posts, said brackets having cylindrical tubular inwardly-extending pivots, a boom pivoted at its rear end upon said tubular pivots to swing vertically at its forward end, said boom extending forwardly and downwardly beyond the forward end of said truck, and supports at the forward end of said turn-table constructed to engage said boom approximately medially to move said boom vertically and to lock the same in adjusted position.

19. In a machine of the nature described, the combination, of a wheeled truck, a turn-table pivoted at its rear end to the rear end of said truck, vertical posts at the rear end of said turn-table, brackets extending rearwardly from said posts, said brackets having opposing cylindrical tubular pivots, a boom pivoted at its rear end upon said tubular pivots to swing vertically at its forward end, said boom extending forwardly and downwardly beyond the forward end of said truck, picking up and elevating mechanism mounted on said boom, and a take-off device in the rear of said turn-table upon which said elevating mechanism discharges, said take-off device being pivoted at its forward end to the rear end of said turn-table to move laterally therewith at its forward end, the rear end of said take-off device being practically stationary with respect to the lateral movement at its forward end.

20. In a machine of the nature described, the combination, of a wheeled truck, a turn-table pivotally mounted at its rear end upon the rear end of said truck, vertical posts at the rear end of said turn-table, brackets projecting rearwardly from said posts, said rearwardly-projecting brackets having inwardly-extending tubular pivots, a boom pivoted at its rear end upon said tubular pivots to swing vertically at its forward end, picking up and elevating mechanism mounted on said boom, a rearwardly extending tubular socket at the rear end of said turn-table, a take-off mechanism pivoted at its forward end in said socket to move laterally with said turn-table, there being near the rear end of said take-off mechanism supports for said take-off mechanism which are constructed to retain the rear end of said take-off mechanism substantially stationary with respect to the lateral movement of the take-off mechanism at the forward end thereof.

21. A machine for picking up and loading loose material, comprising, in combination, a wheeled truck, a turn-table rotatably mounted on said truck, means at the forward end of said truck to support the forward end of said turn-table, a superstructure upon and at the rear end of said turn-table, a boom pivoted at its rear end in said superstructure, picking up and elevating mechanism mounted on said boom, means for raising and lowering said boom at its forward end, a motor constructed to operate said picking up and elevating, said boom-raising and lowering, and turn-table rotating means, said turn-table being pivoted at its rear end to the rear end of said truck, said motor being located upon said turn-table at one side thereof, and means for directing the various movements of the machine and its operating mechanism from one position at one side of the turn-table.

22. A machine for the purpose set forth, comprising a wheeled truck, a horizontally swinging turn-table supported on said truck, a boom pivotally supported at its rear end at the rear end of said turn-table, to swing vertically at its forward end, and horizontally with said turn-table, said turn-table being pivoted at its rear end to the rear end of said truck, there being at the rear end of said truck an upstanding pivot that supports the rear end of said turn-table, and rotatable means at the forward end of said truck to support the forward end of said turn-table, a traveling pick-up and elevating device carried by said boom, a motor carried by the turn-table at one side thereof, means for raising and lowering said boom at its forward end and operative connections between the motor and the turn-table and the boom-raising and lowering means to swing said turn-table and boom on their pivots separately and conjointly, as stated.

23. A machine for the purpose set forth, including a truck, traction wheels on said truck, a horizontally swinging turn-table mounted on the truck, a motor carried by the turn-table, a boom pivotally supported at its rear end on said turn-table to swing vertically at its forward end, means driven by said motor for raising and lowering the boom at its forward end, operative driving connections between said motor and the traction wheels of the truck, and means driven by the motor for swinging the turn-table about its pivot, said turn-table being pivoted at its rear end to the rear end of said truck, said turn-table being supported at its rear end on said pivot, there being rotatable supports at the forward end of said truck to support the forward end of said turn-table, there being no other supports for said turn-table in the rear of its pivot; the rotating of the turn-table and the movement forward and backward of the machine being separately and conjointly operable.

24. A machine for the purpose set forth, including, in combination, a truck, traction wheels on said truck, a horizontally swinging turn-table pivoted to said truck, a vertically swinging boom pivotally mounted at its rear end at the rear end of said turn-table, means including a motor for operating said boom and turn-table, and driving connections between said motor and traction wheels including a vertical shaft arranged in the axis of the turn-table pivot, said turn-table pivot being located at the rear end of said truck and coöperating with a sleeve at the rear end of said turn-table, the driving connection between said motor and the traction wheels and between said motor and the turn-table rotating means being separately and conjointly operable.

25. A machine for the purpose set forth, including, in combination, a truck, traction wheels on said truck, a horizontally swinging turn-table pivoted upon an upstanding pivot on said truck, a boom mounted at its rear end at the rear end of said turn-table to swing horizontally at its forward end with said turn-table and vertically on its pivot, a traveling pick-up and elevating device carried by said boom, a motor on said turn-table, means operated by said motor for swinging said turn-table and said boom on their axes and for driving said pick-up and elevating device, and driving connections between said motor and traction wheels, including a vertical shaft arranged in the axis of the turn-table, said turn-table pivot being located at the rear end of said truck and coöperating with a sleeve pending from the turn-table at the rear end thereof, the driven connection between said motor and the means for raising and lowering the said boom at its forward end, for rotating the turn-table, for forwardly and backwardly moving the truck, and for driving said pick-up and elevating devices being separately and conjointly operable from a position at the side of the turn-table.

26. A machine for the purpose set forth, including, in combination, a truck, traction wheels on said truck, a horizontally swinging turn-table pivoted upon and supported by an upstanding pivot on the rear end of said truck at its rear end, a frame rising from said turn-table the rear members of which are located at the rear end of said turn-table, a boom pivoted at its rear end to said rear-members of said frame, to swing vertically at its forward end, a traveling pick-up and elevating device carried by said boom, a motor on said turn-table located at one side of said frame, means carried by the turn-table and connected to said motor for swinging said turn-table and the boom on their axes, and driving connections between said motor and the pick-up and elevating device including a drive shaft lying in the pivotal axis of said boom, the pivotal axis of the boom being but slightly to the rear of the pivotal axis of the turn-table, the means for swinging the turn-table and for driving the pick-up and elevating device being separately and conjointly operated from one position at the side of said turn-table.

27. In a machine for picking up and loading loose material, the combination, of a wheeled truck, a turn-table rotatably mounted on said truck, there being at the rear end of said truck an upstanding pivot constructed to support the rear end of said turn-table, bearing rollers interposed between the forward ends of said truck and turn-table to support the forward end of said turn-table, a curved rack fixed to the upper surface of said truck between said upstanding pivot and said bearing rollers concentric to said pivot, a motor on said turn-table, there being in the top surface of said turn-table a series of depressions and a recess, there being in the bottom of said recess a vertically pending bearing, and driving connection between turn-table and said motor, said driving connection including a main transmission shaft journaled in bearings forming part of said depressions, said main transmission shaft being geared to said motor, two oppositely facing bevel pinions loosely mounted on said main transmission shaft in said depression, a clutch on the latter shaft constructed to lock said bevel wheels separately to said main transmission shaft, a horizontally disposed bevel gear wheel located in said recess below said bevel pinions to mesh therewith, a vertical shaft journaled in said vertically pending bearing, said bevel gear wheel being affixed to the upper end of said vertical shaft, and a pinion at the lower end of said vertical shaft and meshing with said rack.

28. In a machine for picking up and loading loose material, the combination, of a wheeled truck, a turn-table rotatably mounted at its rear end to the rear end of said truck, a boom pivoted at its rear end to swing vertically at its forward end, supports at the rear end of said turn-table for the rear end of said boom, and means for raising and lowering the forward end of said boom and locking it in adjusted position, said latter means including a motor on said turn-table, a transverse shaft at the forward end of the turn-table operatively connected to said motor, brackets journaled on said transverse shaft there being vertically disposed bearings on said brackets, screw-threaded shafts rotatably mounted at their lower ends in said vertical bearings, nuts on said screw-threaded shafts said nuts being pivoted one on each side approximately medially of said boom, means for preventing lateral movement of said nuts in said boom, and means constructed to connect said rotatable screw-shafts to said forwardly located transverse shaft to permit of the rotation of said screw-threaded shafts in two opposing directions.

29. A machine for the purpose set forth, including, in combination, a wheeled truck, there being at the rear end of said truck an upstanding tubular pivot, a turn-table on said truck, said turn-table having at its rear end a depending box-like structure, a tubular boss on the bottom of said box-like structure engaging said tubular pivot to support said turn-table at its rear end upon the rear end of said truck, a further box-like depending structure in the turn-table near the forward end thereof, said latter structure having centrally a tubular boss affording a bearing, rotatable carriers at the forward end of said truck constructed to support the forward end of said turn-table, there being no supports for the turn-table in the rear of said tubular pivot, a motor on the turn-table, and means for swinging said turn-table including rack-and-pinion gearing at the forward end of said truck, a main transmission shaft longitudinally disposed on said turn-table and geared to said motor by incased worm gearing, two oppositely facing bevel pinions loosely mounted on said main transmission shaft, a horizontally disposed bevel gear wheel located below said bevel pinions and meshing therewith, a clutch splined to said main transmission shaft between said bevel pinions constructed to separately lock said bevel pinions to said main transmission shaft, and a shaft fixed to said horizontally disposed bevel wheel and passing through said tubular boss to connect said bevel wheel to the rack-and-pinion gearing.

30. In a picking up and loading machine, the combination, of a wheeled truck, a turn-table rotatably mounted on said truck, a boom pivotally mounted at its rear end upon said turn-table to swing vertically at its forward end, picking up and elevating mechanism mounted on said boom, and means for raising and lowering the boom at its forward end and locking it in adjusted position, said means including a motor on said turn-table, a transverse shaft rotatably connected to said motor, a main transmission shaft rotatably mounted longitudinally on said turn-table and operatively connected to said transverse shaft, a further transverse shaft rotatably mounted at the forward end of said turn-table, gearing connecting the forward end of said main transmission shaft to said forwardly mounted transverse shaft, two lifting screws located one on each side and approximately medially of said boom, brackets near the outer ends of said forwardly located transverse shaft, said brackets having each a horizontal bearing rotatable on said forwardly located transverse shaft and a vertical bearing in which the lower end of said lifting screw is rotatably mounted, nuts at each side of said boom constructed to engage said lifting screws, gearing at the ends of said forwardly located transverse shaft, gearing at the lower ends of said lifting screws engaging said latter gearing, and clutch mechanism constructed to rotate said forwardly located transverse shaft in two opposing directions.

31. A machine for picking up and loading loose material, including, in combination, a wheeled truck, a turn-table rotatably mounted at its rear end upon said truck, there being at the rear end of said truck an upstanding pivot to support the rear end of said turn-table, a track at the forward end underneath said turn-table, rotative supports upon said truck to support the forward end of said turn-table, a boom on said turn-table, upright supports at the rear end of said turn-table, pivots at the rear of said supports constructed to carry the rear end of said boom to permit it to swing vertically at its forward end, means at the forward end of said turn-table to support said boom medially of its ends said means including screw-threaded shafts, means for operating said screw-threaded shafts including a motor, and means connecting said boom supporting means to said motor, the latter means including a motor transverse shaft, a main transmission shaft below the latter shaft and at right angles thereto, worm and worm wheel gearing connecting said motor shaft to said main transmission shaft, a transverse shaft at the forward end of said turn-table, a bevel gear wheel at the forward end of the main transmission shaft, a pair of oppositely facing bevel pinions located medially on said forward transverse shaft and engaging said bevel gear wheel at diametrically opposite points, brackets rotatably mounted on said forward transverse shaft constructed to support rotatively the lower ends of said screw-threaded shafts, gear wheels on the ends of said screw-threaded shafts and gear wheels at the ends of said forwardly located transverse shaft engaging the latter gear wheels, there being a clutch splined to the latter shaft between the oppositely facing bevel pinions constructed to separately engage the latter pinions to rotate said forwardly located transverse shaft in two opposing directions, there being on each side of said boom a pivoted nut constructed to engage the coacting screw-threaded shaft, there being on said screw-threaded shafts collars above the brackets whereby said screw-threaded shafts are confined in said brackets by the bevel pinions at the lower ends of said screw-threaded shafts.

32. In a machine for the purpose set forth, the combination of a wheeled truck, a turn-table rotatably mounted at its rear end to the rear end of said truck, a superstructure on said turn-table including a multiplicity of supports two of which are located at the rear end of the turn-table, brackets extending rearwardly from said rear supports, said brackets having inwardly extending tubular journals, a boom pivoted at its rear end upon said tubular journals to swing vertically at its forward end, pick up and elevating mechanism mounted to travel on said boom including two link belts in spaced parallel relation, a pair of driving sprocket wheels at the rear end of said boom, a shaft rotatable in said brackets and tubular journals to which said driving sprocket wheels are affixed, a pair of longitudinally adjustable brackets at the forward end of said boom, a transverse shaft fixedly mounted in said brackets, two idler sprocket wheels rotatable on said fixed shaft, said link belts being trained over said sprocket wheels, said link belts being transversely connected at spaced intervals by the pivots of said link belts, buckets fixedly connected to said link belts, and means for rotating said rearwardly located driving shaft.

33. In a machine for the purpose set forth, the combination of a wheeled truck, a turn-table rotatably mounted at its rear end to the rear end of said truck, a superstructure on said turn-table including a multiplicity of posts, two of which are located at the rear end of said turn-table, brackets extending rearwardly from said rear posts said brackets having inwardly extending tubular journals, a boom pivoted at its rear end upon said tubular journals to swing vertically at its forward end, pick up and elevating mechanism mounted to travel on said boom including two link belts in spaced parallel relation, a pair of driving sprocket wheels at the rear end of said boom, a shaft rotatable in said brackets and tubular journals to which said driving sprocket wheels are affixed, a pair of longitudinally adjustable brackets at the forward end of said boom, a transverse shaft fixedly mounted in said brackets, two idler sprocket wheels rotatable on said fixed shaft, said link belts being trained over said sprocket wheels, said link belts being transversely connected at spaced intervals by the pivots of said link belts, and means for rotating said rearwardly located driving shaft, said latter means including a motor located on said turn-table, a transversely located motor shaft, a further transverse shaft located in the rear of said motor shaft and geared thereto, a clutch-sprocket wheel loosely mounted on the latter shaft, a clutch member splined to move longitudinally thereon to engage said last named sprocket wheel, and link belt connection between this sprocket wheel and said driving shaft.

34. In a machine for picking up and loading loose material, the combination of a wheeled truck, a turn-table mounted at its rear end to the rear of said truck, a boom pivoted at its rear end to the rear end of said turn-table, traveling pick-up and elevating mechanism mounted on said boom to carry the picked up material upwardly to the rear of said turn-table, and a take off device to carry the upwardly moved material backwardly, said take off device including a horizontal frame having a cross bar at its forward end, a pivot depending medially from said cross bar, a socket medially located at the rear end of said turn-table to engage said depending pivot to cause the forward end of the take-off frame to swing laterally with said turn table, traveling conveying mechanism mounted in said frame, and guard plates for said conveying mechanism secured to the rear of the turn-table to swing laterally therewith.

35. In a machine for picking up and loading loose material, the combination of a wheeled truck, a turn-table mounted at its rear end to the rear end of said truck, a boom pivoted at its rear end to the rear end of said turn-table, traveling pick up and elevating mechanism mounted on said boom to carry the picked up material upwardly to the rear of said turn-table, and a take off device to carry the picked up material back of the turn-table, said take off device including a horizontal frame, a cross bar at the forward end of said frame, a pivot depending medially from said cross bar, a socket located medially at the rear end of said turn-table to engage said depending pivot to cause the forward end of the take off frame to swing laterally with said turn-table, traveling conveying mechanism mounted in said frame, guard-plates for the forward end of said conveying mechanism, said guard plates being vertically disposed at the sides of said conveying mechanism and attached to the rear end of the turn-table to move laterally therewith, there being on said guard plates aprons overlying said conveyer mechanism.

36. In a machine for picking up and loading loose material, the combination of a wheeled truck, a turn-table rotatably mounted at its rear end to the rear end of said truck, a frame structure rising from the turn-table including posts located at the rear end of the turn-table, pivot members on said posts, a boom journaled at its rear end on said pivot members and projecting forwardly and downwardly beyond said truck, picking up and elevating mechanism mounted on said boom to travel longitudinally thereon to convey the picked up material upwardly to the rear of the turn-table, a take off device to carry the elevated material backwardly to the rear of the machine, said take off device including a substantially horizontal frame, a cross bar at the forward end of said frame, a depending pivot on said cross bar, a socket extending rearwardly from said turn-table and engaging said pivot to swing the forward end of said frame laterally with the turn-table, a conveyer belt traveling longitudinally on said frame, guard members for the sides of said conveyer belt said guard members being secured to said rear posts, and aprons secured to said guard members to overlie said conveyer belt at its longitudinal margins.

37. A machine for picking up and loading loose matter, including, in combination, a truck, a turn-table on said truck, a boom on said turn-table, picking up and elevating mechanism traveling on said boom to elevate said picked up matter and convey the same to the rear of said boom, and a take-off mechanism constructed to carry the elevated matter to the rear of the machine, said take-off mechanism being pivotally connected at its forward end to the rear end of the turn-table to move laterally therewith, there being supports at the rear end of said take-off mechanism which are substantially stationary with respect of the lateral movement thereof at the forward end.

38. A machine for picking up and elevating loose matter, including, in combination, a truck, a turn-table on said truck, a boom on said turn-table, picking up and elevating mechanism traveling on said boom to elevate said picked up matter and convey the same to the rear of said boom, and a take-off mechanism constructed to carry the elevated matter to the rear of the machine, said take-off mechanism being pivotally connected at its forward end to the rear end of the turn-table to move laterally therewith at its forward end, there being at the rear end of said take-off mechanism supports, said supports being constructed to serve as a pivot for the rear end of said take-off mechanism and as runners when the machine is forwardly and backwardly moved.

In testimony, that I claim the foregoing as my invention I affix my signature in the presence of witnesses, this 28th day of May, A. D. 1909.

GEORGE W. JACKSON.

Witnesses:
    T. A. GETTLESON,
    M. W. CLUXTON,
    K. M. CLUXTON,
    W. L. HALL.